US010821705B2

(12) United States Patent
Kotake et al.

(10) Patent No.: US 10,821,705 B2
(45) Date of Patent: Nov. 3, 2020

(54) AEROGEL LAMINATED COMPOSITE AND THERMAL INSULATION MATERIAL

(71) Applicant: HITACHI CHEMICAL COMPANY, LTD., Tokyo (JP)

(72) Inventors: Tomohiko Kotake, Tokyo (JP); Satoshi Takayasu, Tokyo (JP); Yuta Akasu, Tokyo (JP); Hiroyuki Izumi, Tokyo (JP); Chisato Kikkawa, Tokyo (JP); Tatsuya Makino, Tokyo (JP); Masato Miyatake, Tokyo (JP)

(73) Assignee: HITACHI CHEMICAL COMPANY, LTD., Tokyo (JP)

( * ) Notice: Subject to any disclaimer, the term of this patent is extended or adjusted under 35 U.S.C. 154(b) by 0 days.

(21) Appl. No.: 15/756,878

(22) PCT Filed: Aug. 29, 2016

(86) PCT No.: PCT/JP2016/075230
§ 371 (c)(1),
(2) Date: Mar. 1, 2018

(87) PCT Pub. No.: WO2017/038779
PCT Pub. Date: Mar. 9, 2017

(65) Prior Publication Data
US 2018/0250913 A1    Sep. 6, 2018

(30) Foreign Application Priority Data
Sep. 2, 2015   (JP) ................. 2015-172788

(51) Int. Cl.
*B32B 9/04*   (2006.01)
*F16L 59/02*   (2006.01)
(Continued)

(52) U.S. Cl.
CPC .............. *B32B 9/045* (2013.01); *B32B 5/022* (2013.01); *B32B 5/028* (2013.01); *B32B 5/16* (2013.01);
(Continued)

(58) Field of Classification Search
None
See application file for complete search history.

(56) References Cited

U.S. PATENT DOCUMENTS 4,374,933 A    2/1983   Scholze et al.
4,402,927 A    9/1983   von Dardel et al.
(Continued)

FOREIGN PATENT DOCUMENTS

JP    H6-219726 A    8/1994
JP    H7-185306 A    7/1995
(Continued)

OTHER PUBLICATIONS

Shibata, T. et al., Heat Insulating Structure Comprising Aerogel, Sep. 4, 2014, machine translation of WO2014132652 (Year: 2014).*
(Continued)

*Primary Examiner* — Chinessa T. Golden
(74) *Attorney, Agent, or Firm* — Fitch, Even, Tabin & Flannery, L.L.P.

(57) ABSTRACT

The present invention relates to an aerogel laminated composite having a structure in which a porous spacer layer, an aerogel layer and a support having a heat ray reflective function or a heat ray absorbing function are laminated in this order.

18 Claims, 5 Drawing Sheets

(51) Int. Cl.
*B32B 7/02* (2019.01)
*B32B 5/18* (2006.01)
*B32B 5/02* (2006.01)
*B32B 5/16* (2006.01)
*B32B 5/24* (2006.01)
*B32B 5/30* (2006.01)

(52) U.S. Cl.
CPC ............... *B32B 5/18* (2013.01); *B32B 5/24* (2013.01); *B32B 5/30* (2013.01); *B32B 7/02* (2013.01); *F16L 59/02* (2013.01); *B32B 2250/03* (2013.01); *B32B 2264/10* (2013.01); *B32B 2307/304* (2013.01)

(56) References Cited

U.S. PATENT DOCUMENTS

| | | | |
|---|---|---|---|
| 4,680,048 A * | 7/1987 | Motoki | C03B 19/12 501/12 |
| 5,207,814 A | 5/1993 | Cogliati et al. | |
| 5,496,527 A | 3/1996 | Yokogawa et al. | |
| 5,830,387 A | 11/1998 | Yokogawa et al. | |
| 9,309,369 B1 | 4/2016 | Meador | |
| 2002/0025900 A1 | 2/2002 | Hsu et al. | |
| 2007/0004306 A1* | 1/2007 | Leeser | B32B 3/266 442/394 |
| 2011/0114414 A1* | 5/2011 | Bliton | B32B 5/26 181/286 |
| 2013/0338247 A1 | 12/2013 | Leventis et al. | |
| 2014/0134415 A1 | 5/2014 | Gong et al. | |

FOREIGN PATENT DOCUMENTS

| | | | |
|---|---|---|---|
| JP | 09109323 A * | 4/1997 | |
| JP | H09-109323 A | 4/1997 | |
| JP | H10-72212 A | 3/1998 | |
| JP | 2000-026609 A | 1/2000 | |
| JP | 2000-129127 A | 5/2000 | |
| JP | 2001-179866 A | 7/2001 | |
| JP | 2003-231755 A | 8/2003 | |
| JP | 2004-203632 A | 7/2004 | |
| JP | 2011-093744 A | 5/2011 | |
| JP | 2012-233110 A | 11/2012 | |
| JP | 5250900 B2 | 7/2013 | |
| WO | 2007/010949 A1 | 1/2007 | |
| WO | 2014/132652 A1 | 9/2014 | |
| WO | WO-2014132652 A1 * | 9/2014 | ............ C04B 38/00 |

OTHER PUBLICATIONS

Okamoto K. et al., Laminated Insulating Material, Apr. 28, 1997, machine translation of JP09109323 (Year: 1997).*
Search Report of EP Patent Application No. 15755570.7 dated Oct. 10, 2017 in English.
International Preliminary Report on Patentability of Appln. No. WO PCT/JP2015/055371 dated Sep. 9, 2016 in English.
Wong et al. "Mechanical properties of monolithic silica aerogels made from polyethoxydisiloxanes" Microporous and Mesoporous Materials 183, 2014, 23-29. (Year: 2014).
Nadargi et al. "Studies on rheological properties of methyltrielhoxysilane (MTES) based flexible superhydrophobic silica aerogels" Microporous and Mesoporous Materials, 117, 2009, 617-626. (Year: 2009).
Hu et al. "Ultralight and Highly Compressible Graphene Aerogels" Adv. Maler. 2013, 25, 2219-2223. (Year: 2013).
Liao et al. "Engineering thermal and mechanical properties of flexible fiber-reinforced aerogel composites" J Sol-Gel Sci Technol, 2012, 63, 445-456 (Year: 2012).
Sun et al. "Multifunctional, Ultra-Flyweight, Synergislically Assembled Carbon Aerogels" Adv. Maler. 2013, 25, J554-2560. (Year: 2013).
Randall et al., "Polymer reinforced silica aerogels: effects of dimethyldiethoxysilane and bis{trimethoxysilylpropyl)amine as silane precursors", J_ Mater. Chem. A., 2013, 1, pp. 6642-6652 (Cited in Office Action dated Oct. 31, 2018 for U.S. Appl. No. 15/121,668).
Hayase et al. "New flexible aerogels and xerogels derived from methyltrimethoxysilane/dimethyldimethoxysilane co-precursors" J. Mater Chem. 2011, 21, 17077-17079. (Year: 2011).

* cited by examiner

AEROGEL LAMINATED COMPOSITE AND THERMAL INSULATION MATERIAL

CROSS-REFERENCE TO RELATED APPLICATIONS

This application is a U.S. national phase application filed under 35 U.S.C. § 371 of International Application No. PCT/JP2016/075230, filed Aug. 29, 2016, which claims priority from Japanese Patent Application No. 2015-172788, filed Sep. 2, 2015, designating the United States, which are hereby incorporated herein by reference in their entirety.

TECHNICAL FIELD

The present invention relates to an aerogel laminated composite and a thermal insulation material.

BACKGROUND ART

Recently, requirements for comfortability of living spaces and energy saving have been increasing; for this reason, the shapes of target objects required for thermal insulation properties tend to become complex, and the spaces for disposing thermal insulation materials tend to be reduced. For this reason, a thermal insulation material having not only enhanced thermal insulation performance but also a lower thickness has been required.

As an attempt for an enhancement in thermal insulation performance of a thermal insulation material using a foamed resin, for example, a plate-like foamed body containing at least one layer of metal thin film on the surface and/or the inside of a polypropylene-based resin foamed body has been proposed in Patent Literature 1.

Moreover, cryogenic substances such as liquid nitrogen and liquid helium are stored in containers having a double-walled structure composed of an internal container and an external container; the space between the internal container and the external container is in vacuum, and is filled with a thermal insulation material. As a thermal insulation material filled into such a vacuum space, for example, a laminated thermal insulation material in which a reflective film having a metal layer formed on one or both surfaces of a polyimide film and a net-like spacer composed of plastic yarns are laminated is disclosed in Patent Literature 2.

CITATION LIST

Patent Literature

Patent Literature 1: JP 2001-179866 A
Patent Literature 2: JP 09-109323 A

SUMMARY OF INVENTION

Technical Problem

However, in the case of the thermal insulation material using a resin foamed body, the foamed body needs to be thick to obtain good thermal insulation performance; a reduction in thickness of the thermal insulation layer is difficult. Moreover, the thermal insulation materials used in the fields of cryogenic techniques and superconductive techniques needing the cryogenic substances have been required for a further enhancement in thermal insulation performance while the thickness is reduced.

The present invention has been made in consideration of the circumstances above, and an object of the present invention is to provide an aerogel laminated composite having superior thermal insulation properties and enabling a reduction in thickness, and a thermal insulation material including the aerogel laminated composite.

Solution to Problem

The inventors diligently studied in order to achieve the objects, and as the result found that that an aerogel laminated composite having at least one structure prepared by laminating a porous spacer layer, an aerogel layer and a specific support in the thickness direction has high thermal insulation performance, and enables a reduction in thickness, and has completed the present invention.

Namely, the present invention provides an aerogel laminated composite having a structure in which a porous spacer layer, an aerogel layer and a support having a heat ray reflective function or a heat ray absorbing function are laminated in this order.

From the viewpoint of further enhancing thermal insulation properties of the aerogel laminated composite, the porous spacer layer may be a layer composed of a material comprising at least one selected from the group consisting of nylon fiber, polyester fiber, polyimide fiber and glass fiber. Moreover, when the porous spacer layer is a layer comprising a glass non-woven fabric, a polyester non-woven fabric, a glass fiber paper, a polyester net, or a nylon mesh, higher thermal insulation properties can be attained.

The above aerogel layer may be a layer containing an aerogel having a structure derived from polysiloxane. Thereby, the thickness of the aerogel layer can be reduced, and an effect of enhancing the thermal insulation properties of the aerogel laminated composite is more readily developed.

Moreover, the above aerogel layer may be a layer composed of a dry product of a wet gel that is a condensation product of a sol containing at least one selected from the group consisting of a silicon compound having a hydrolyzable functional group or a condensable functional group, and a hydrolysis product of the silicon compound having a hydrolyzable functional group. The aerogel laminated composite thus obtained has a superior balance between the thermal insulation properties and the flexibility.

The above sol may further contain silica particles. Thereby, higher thermal insulation properties and flexibility can be attained.

The average primary particle diameter of the above silica particles can be 1 nm or more and 500 nm or less. Thereby, the thermal insulation properties and the flexibility are more readily enhanced.

The above support can have a layer composed of a material containing at least one selected from the group consisting of carbon graphite, aluminum, magnesium, silver, titanium, carbon black, metal sulfates, and antimony compounds. Moreover, if the above support is an aluminum foil or an aluminum deposited film, higher thermal insulation properties can be attained.

Moreover, the present invention can provide a thermal insulation material including the aerogel laminated composite described above. Such a thermal insulation material has high handling properties, and can develop high thermal insulation performance while the thickness is reduced.

Advantageous Effects of Invention

According to the present invention, an aerogel laminated composite having high thermal insulation properties and enabling a reduction in thickness can be provided. A thermal insulation material having such an aerogel laminated composite has high handling properties, and can develop high thermal insulation performance while the thickness is reduced.

DESCRIPTION OF EMBODIMENTS

An Embodiment of the present invention will be described below in detail occasionally with reference to a drawing, provided that the present invention be not limited to the following Embodiment.

Definitions

In this specification, a numerical value range described with "from A to B" refers to the range encompassing the numerical values before and after "to" as the minimum value and the maximum value, respectively. In numerical value ranges described stepwise in this specification, the upper limit value or lower limit value of the step of one numerical value range may be replaced with the upper limit value or lower limit value of the step of another numerical value range. In numerical value ranges described in this specification, the upper limit value or lower limit value of the numerical value ranges may be replaced with the values shown in the Example. "A or B" may include any one of A and B, or may include both. Materials exemplified in this specification, unless otherwise stated, may be used singly, or in a combination of 2 or more thereof. In this specification, the content of each ingredient in the composition, unless otherwise stated, means the total amount of a plurality of substances present in the composition when there are a plurality of substances corresponding to respective ingredients in the composition.

[Aerogel Laminated Composite]

The aerogel laminated composite according to the Embodiment has a structure in which a porous spacer layer, an aerogel layer and a support having a heat ray reflective function or a heat ray absorbing function are laminated in this order. High thermal insulation properties can be developed by providing the porous spacer layer on the aerogel layer. The porous spacer layer can serve as a thermal insulation layer under a high vacuum, and by laminating it onto the aerogel layer, it can play a role in enhancing the degree of vacuum of the aerogel layer having nano-sized pores. The aerogel layer has high pliability, which enables the aerogel formed into a sheet, which was conventionally difficult with respect to handling properties; such an aerogel can be integrated with the support; for this reason, in the case where the aerogel laminated composite is used as a thermal insulation material, the thickness of the thermal insulation layer can be reduced. The support having a heat ray reflective function or a heat ray absorbing function, which is a non-aerogel layer, functions as a radiating body, and can play a role in blocking external heat. Moreover, in the case where a plurality of aerogel laminated composites are layered, the porous spacer layer and the aerogel layer having high thermal insulation properties are interposed between a support and another support; for this reason, heat conduction caused by contact of the supports can be suppressed.

Figure 1:
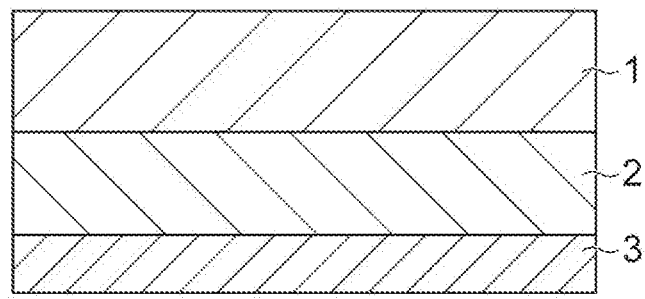
FIG. 1 is a schematic cross-sectional view of the aerogel laminated composite according to the Embodiment.

FIG. 1 is a diagram schematically illustrating a cross-section of the aerogel laminated composite according to the Embodiment. As illustrated in FIG. 1, the aerogel laminated composite has a structure in which the porous spacer layer 1 and the aerogel layer 2 is laminated on at least one surface of a support 3 having a heat ray reflective function or a heat ray absorbing function. By giving one or more structures described above to the aerogel laminated composite, a reduction in thickness can be achieved to obtain an aerogel laminated composite having high thermal insulation properties and flexibility. It should be noted that the porous spacer layer 1 and the aerogel layer 2 may be laminated on both surfaces of the support 3.

Figure 2:
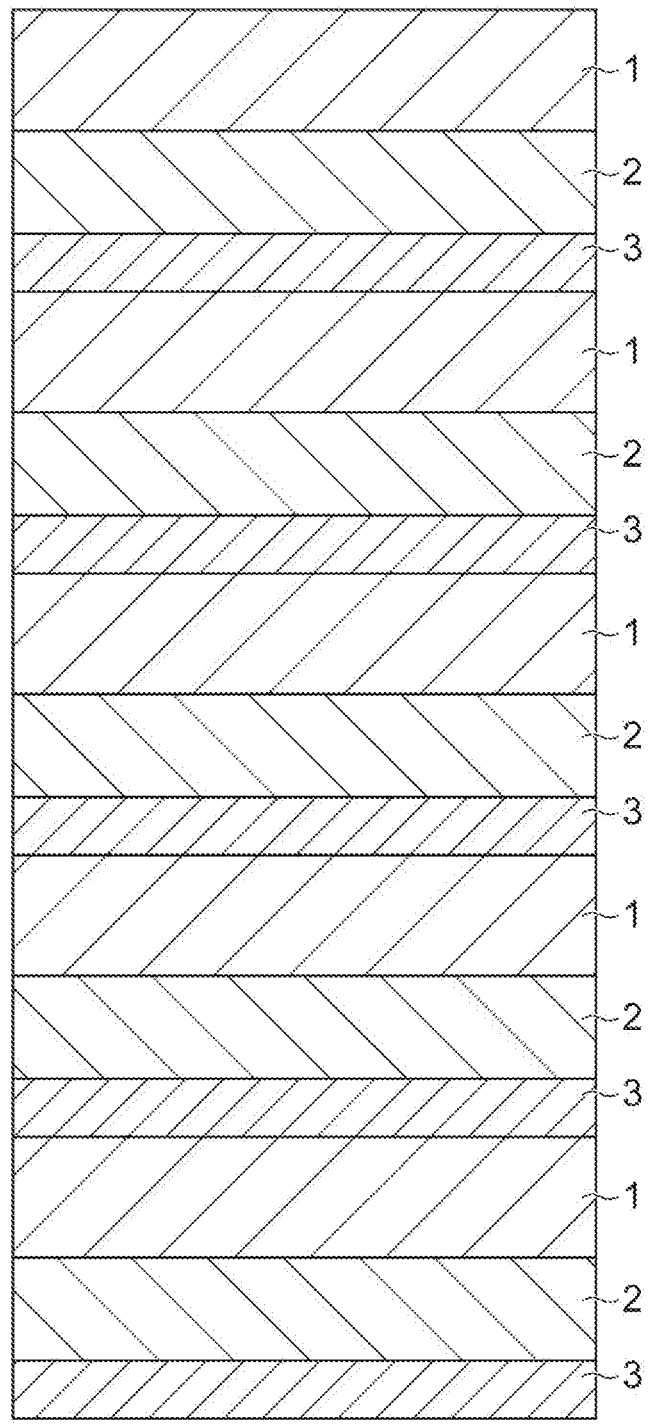
FIG. 2 is a schematic cross-sectional view of a multi-layered laminate in which the aerogel laminated composite according to the Embodiment is laminated.

FIG. 2 is a diagram schematically illustrating a cross-section of a multi-layered laminate in which a plurality of the aerogel laminated composites according to the Embodiment are laminated. As illustrated in FIG. 2, the aerogel laminated composite according to the Embodiment can be formed into a multi-layered laminate in which a plurality of porous spacer layers 1, aerogel layers 2 and supports 3 are laminated in this order. The multi-layered laminate may have 5 layers or more, 10 layers or more, 20 layers or more, or 30 layers or more as long as the porous spacer layer and the aerogel layer are laminated so that the supports 3 do not directly contact each other.

By disposing a multi-layered structure in which the porous spacer layer 1, the aerogel layer 2 and the support 3 are laminated, high thermal insulation performance which cannot be obtained in a single-layer aerogel laminated composite can be developed.

<Porous Spacer Layer>

A porous spacer is a collective term for a material comprising many porous structures, and it is referred to as a porous spacer regardless of the size of pores in this Embodiment. The porous spacer layer according to the Embodiment is a non-aerogel layer, but also has a porous structure and can serve as a thermal insulation layer under a high vacuum. Moreover, by laminating the porous spacer onto the aerogel layer, it can enhance the degree of vacuum of the aerogel layer having nano-sized pores. Furthermore, the porous spacer layer is interposed between a support and another support; and thus, heat conduction caused by contact of the supports can be suppressed. The configuration of the porous spacer layer is not particularly limited, and may be a single layer or a multi-layer. The porous spacer layer is not particularly limited as long as it is composed of a layer having a porous structure. The porous spacer layer may be composed of the same type of porous spacer or different types of porous spacers. Namely, the porous spacer layers 1 illustrated in FIGS. 1 and 2 may be a single layer consisting of one type of porous spacer, a multi-layer consisting of the same type of porous spacer, or a multi-layer consisting of two or more different types of porous spacers. The shape of the porous spacer layer can be a sheet shape because it can enhance the handling properties of the aerogel laminated composite.

Materials composing the porous spacer layer include, for example, organic fibers such as nylon fiber, polyester fiber, polypropylene fiber, polyethylene fiber, polyacrylonitrile fiber, polyimide fiber, aramid fiber and carbon fiber, and inorganic fibers such as glass fiber, rock wool and ceramic fiber. These may be used alone or in combination. From the viewpoint of further readily enhancing the thermal insulation properties and having high handling properties, the porous spacer layer may be a layer composed of a material comprising at least one selected from the group consisting of nylon fiber, polyester fiber, polyimide fiber and glass fiber. The form of a fiber composing the porous spacer layer includes, but not particularly limited to, for example, a woven fabric, a knitted fabric, a non-woven fabric, a paper, a net, or a mesh. From the viewpoint of further readily enhancing the thermal insulation properties and having high inexpensiveness and handling properties, the porous spacer layer may be a layer comprising a glass non-woven fabric, a polyester non-woven fabric, a glass fiber paper, a polyester net, or a nylon mesh.

Moreover, when the aerogel laminated composite is used for an application where flame resistance is required while ensuring certain thermal insulation properties, materials composing the porous spacer layer may be metallic fiber such as copper fiber, iron fiber, stainless fiber, gold fiber, silver fiber and aluminum fiber. The metallic fiber may be used in combination with the above organic fibers or inorganic fibers.

The thickness of the porous spacer layer is not particularly limited, but from the viewpoint of the handling properties, it may be 1 µm or more, 10 µm or more, or 50 µm or more. On the other hand, from the viewpoint of enhancing the thermal insulation properties, the thickness of the porous spacer layer may be 300 µm or less, 200 µm or less, or 100 µm or less. Namely, the thickness of the porous spacer layer may be 1 to 300 µm, 10 to 200 µm, or 50 to 100 µm.

The porosity of the porous spacer layer is not particularly limited, but from the viewpoint of enhancing the thermal insulation properties, it may be 5% or more, 20% or more, or 30% or more. On the other hand, from the viewpoint of the handling properties, the porosity of the porous spacer layer may be 98% or less, 95% or less, or 90% or less. Namely, the porosity of the porous spacer layer may be 5 to 98%, 20 to 95%, or 30 to 90%.

<Aerogel Layer>

The aerogel layer according to the Embodiment is a layer composed of an aerogel. In a narrow sense, a dried gel obtained by a supercritical drying method from a wet gel is called as aerogel, a dried gel obtained by drying at the atmospheric pressure therefrom is called as xerogel, and a dried gel obtained by freeze-drying therefrom is called as cryogel, however in this Embodiment a low density dried gel obtained from a wet gel without using the above drying techniques is called as aerogel. In other words, aerogel in the Embodiment means aerogel in a broad sense, namely "Gel comprised of a microporous solid in which the dispersed phase is a gas". Generally the inside of an aerogel is configured as a networked microstructure, having a cluster structure in which approx. 2 to 20-nm aerogel particles (particles composing the aerogel) are bonded together. There are pores in a size less than 100 nm among skeletons formed by the clusters. Thereby, the aerogel constitutes a three-dimensional microporous structure. In this regard, an aerogel according to the Embodiment is a silica aerogel containing silica as a main component. Examples of a silica aerogel include a so-called organic-inorganic hybridized silica aerogel, in which an organic group (such as a methyl group), or an organic chain is introduced. For example, the aerogel layer according to the Embodiment is a layer composed of an aerogel. The aerogel layer may be a layer containing an aerogel having a structure derived from polysiloxane.

The aerogel according to the Embodiment may be a dry product of a wet gel that is a condensation product of a sol containing at least one selected from the group consisting of a silicon compound having a hydrolyzable functional group or a condensable functional group (in the molecule), and a hydrolysis product of the silicon compound having a hydrolyzable functional group. Namely, the aerogel according to the Embodiment may be obtained by drying a wet gel formed from a sol containing at least one selected from the group consisting of a silicon compound having a hydrolyzable functional group or a condensable functional group (in the molecule), and a hydrolysis product of the silicon compound having a hydrolyzable functional group. By using these modes, the thermal insulation properties and flexibility of the aerogel layer are further enhanced. The condensation product may be obtained through the condensation reaction of a hydrolysis product obtained by the hydrolysis of the silicon compound having a hydrolyzable functional group, or through the condensation reaction of the silicon compound having a condensable functional group that is not a functional group obtained by the hydrolysis. The silicon compound may have at least one of a hydrolyzable functional group and a condensable functional group, or both of the hydrolyzable functional group and the condensable functional group. As described above, it should be noted that each aerogel described later may be a dry product of a wet gel that is a condensation product of a sol containing at least one selected from the group consisting of a silicon compound having a hydrolyzable functional group or a condensable functional group, and a hydrolysis product of the silicon compound having a hydrolyzable functional group (it may be obtained by drying the wet gel formed from the sol).

The aerogel layer may be a layer composed of a dry product of a wet gel that is a condensation product of a sol containing at least one selected from the group consisting of a silicon compound having a hydrolyzable functional group or a condensable functional group, and a hydrolysis product of the silicon compound having a hydrolyzable functional group. Namely, the aerogel layer may be composed of a layer prepared by drying a wet gel formed from a sol containing at least one selected from the group consisting of a silicon compound having a hydrolyzable functional group or a condensable functional group, and a hydrolysis product of the silicon compound having a hydrolyzable functional group.

The aerogel according to the Embodiment may contain polysiloxane having the main chain comprising a siloxane bond (Si—O—Si). The aerogel may have, as structural units, M, D, T or Q units described below.

[Chemical Formula 1]

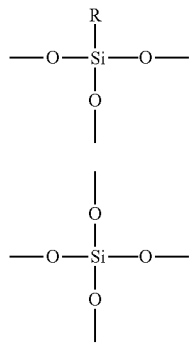

In the above formula, R represents an atom (such as, hydrogen atom) or an atomic group (such as, alkyl group) bonded to the silicon atom. The M unit is a unit composed of a monovalent group in which the silicon atom bonds to one oxygen atom. The D unit is a unit composed of a divalent group in which the silicon atom bonds to two oxygen atoms. The T unit is a unit composed of a trivalent group in which the silicon atom bonds to three oxygen atoms. The Q unit is a unit composed of a quadrivalent group in which the silicon atom bonds to four oxygen atoms. The information regarding the contents of these units can be obtained through Si-NMR.

The aerogel according to the Embodiment may contain silsesquioxane. Silsesquioxane is polysiloxane having the above T units as the structural unit, and has the compositional formula: $(RSiO_{1.5})_n$. Silsesquioxane may have a variety of skeleton structures such as a cage type, a ladder type, or a random type.

Examples of the hydrolyzable functional group include alkoxy groups. Examples of the condensable functional group (excluding a functional group corresponding to a hydrolyzable functional group) include a hydroxyl group, silanol group, carboxyl group and phenolic hydroxyl group. The hydroxyl group may be comprised in a hydroxyl group-containing group such as hydroxyalkyl groups. Each of the hydrolyzable functional group and condensable functional group may be used singly, or in a combination of 2 or more thereof.

The silicon compound can include a silicon compound having an alkoxy group as a hydrolyzable functional group, and a silicon compound having a hydroxyalkyl group as a condensable functional group. The silicon compound may have, from the viewpoint of further enhancing the flexibility of the aerogel, at least one selected from the group consisting of an alkoxy group, a silanol group, a hydroxyalkyl group and a polyether group. The silicon compound may have, from the viewpoint of enhancing the compatibility of the sol, at least one selected from the group consisting of an alkoxy group and a hydroxyalkyl group.

From the viewpoint of enhancement of the reactivity of the silicon compound and reduction of the thermal conductivity coefficient of the aerogel, each carbon number of an alkoxy group and a hydroxyalkyl group may be 1 to 6; however from the viewpoint of improving further the flexibility of the aerogel, it may be also 2 to 4. Examples of the alkoxy group include a methoxy group, an ethoxy group, and a propoxy group. Examples of the hydroxyalkyl group include a hydroxymethyl group, a hydroxyethyl group, and a hydroxypropyl group.

Examples of the aerogel according to the Embodiment include the following modes. By using these modes, it is easy to obtain an aerogel having further high thermal insulation properties and high flexibility and enabling formation of a thin film. By using each of the modes, an aerogel having thermal insulation properties and flexibility and enabling formation of a thin film according to each of the modes can be obtained.

(First Mode)

The aerogel according to the Embodiment may be a dry product of a wet gel that is a condensation product of a sol containing at least one compound (hereinafter, occasionally referred to as a "polysiloxane compound group") selected from the group consisting of a polysiloxane compound having a hydrolyzable functional group or a condensable functional group (in the molecule), and a hydrolysis product of the polysiloxane compound having a hydrolyzable functional group (the polysiloxane compound in which the hydrolyzable functional group has been hydrolyzed). Namely, the aerogel according to the Embodiment may be obtained by drying a wet gel formed from a sol containing at least one selected from the group consisting of a polysiloxane compound having a hydrolyzable functional group or a condensable functional group (in the molecule), and a hydrolysis product of the polysiloxane compound having a hydrolyzable functional group. As described above, it should be noted that each aerogel described later may also be a dry product of a wet gel that is a condensation product of a sol containing at least one selected from the group consisting of a polysiloxane compound having a hydrolyzable functional group or a condensable functional group, and a hydrolysis product of the polysiloxane compound having a hydrolyzable functional group (it may be obtained by drying the wet gel formed from the sol).

The aerogel layer may be a layer composed of a dry product of a wet gel that is a condensation product of a sol containing at least one selected from the group consisting of a polysiloxane compound having a hydrolyzable functional group or a condensable functional group, and a hydrolysis product of the polysiloxane compound having a hydrolyzable functional group. Namely, the aerogel layer may be composed of a layer prepared by drying a wet gel formed from a sol containing at least one selected from the group consisting of a polysiloxane compound having a hydrolyzable functional group or a condensable functional group, and a hydrolysis product of the polysiloxane compound having a hydrolyzable functional group.

Furthermore, the polysiloxane compound having a hydrolyzable functional group or a condensable functional group may have a reactive group different from a hydrolyzable functional group and a condensable functional group (a functional group not corresponding to a hydrolyzable functional group and a condensable functional group). Examples of the reactive group include, but should not be particularly limited to, an epoxy group, a mercapto group, a glycidoxy group, a vinyl group, an acryloyl group, a methacryloyl group, and an amino group. The epoxy group may be comprised in an epoxy group-containing group, such as a glycidoxy group. Polysiloxane compounds having the reactive group may be used singly, or in a combination of 2 or more thereof.

Examples of a polysiloxane compound having a hydroxyalkyl group include compound having a structure expressed by the following Formula (A).

[Chemical Formula 2]

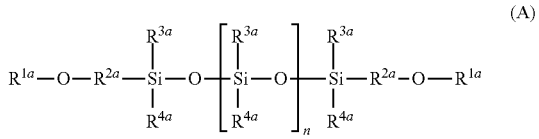

(A)

In Formula (A), $R^{1a}$ represents a hydroxyalkyl group, $R^{2a}$ represents an alkylene group, $R^{3a}$ and $R^{4a}$ each independently represent an alkyl group or an aryl group, and n represents an integer of 1 to 50. In this case, examples of an aryl group include a phenyl group, and a substituted phenyl group. Examples of a substituent of the substituted phenyl group include an alkyl group, a vinyl group, a mercapto group, an amino group, a nitro group, and a cyano group. In Formula (A), 2 $R^{1a}$ may be respectively the same or different, and similarly 2 $R^{2a}$ may be respectively the same or different. In Formula (A), 2 or more $R^{3a}$ may be respectively the same or different, and similarly 2 or more $R^{4a}$ may be respectively the same or different.

When a wet gel that is a condensation product of a sol containing a polysiloxane compound having the above structure (the wet gel formed from the sol) is used, an aerogel which has a low thermal conductivity coefficient and is flexible can be obtained further easily. From a similar viewpoint, characteristics shown below may be satisfied. Examples of $R^{1a}$ in Formula (A) include C1 to C6 hydroxyalkyl groups; and examples thereof specifically include a hydroxyethyl group and a hydroxypropyl group. Examples of $R^{2a}$ in Formula (A) include C1 to C6 alkylene groups; and examples thereof specifically include an ethylene group and a propylene group. In Formula (A), $R^{3a}$ and $R^{4a}$ may be each independently a C1 to C6 alkyl group or a phenyl group. The alkyl group may be a methyl group. In Formula (A), n may be 2 to 30, or may be also 5 to 20.

For a polysiloxane compound having a structure expressed by Formula (A), a commercial product may be used, and examples thereof include compounds, such as X-22-160AS, KF-6001, KF-6002 and KF-6003 (all produced by Shin-Etsu Chemical Co., Ltd.), and compounds, such as XF42-B0970 and Fluid OFOH 702-4% (all produced by Momentive Performance Materials Inc.).

Examples of a polysiloxane compound having an alkoxy group include compounds having a structure expressed by the following Formula (B).

[Chemical Formula 3]

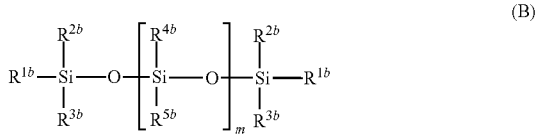

(B)

In Formula (B), $R^{1b}$ represents an alkyl group, an alkoxy group or an aryl group, $R^{2b}$ and $R^{3b}$ each independently represent an alkoxy group, $R^{4b}$ and $R^{5b}$ each independently represent an alkyl group or an aryl group, and m represents an integer of 1 to 50. In this case, examples of an aryl group include a phenyl group, and a substituted phenyl group. Examples of a substituent of a substituted phenyl group include an alkyl group, a vinyl group, a mercapto group, an amino group, a nitro group, and a cyano group. Meanwhile, in Formula (B), 2 $R^{1b}$ may be respectively the same or different, 2 $R^{2b}$ may be respectively the same or different, and similarly 2 $R^{3b}$ may be respectively the same or different. In Formula (B), in a case where m is an integer of 2 or higher, 2 or more $R^{4b}$ may be respectively the same or different, and similarly 2 or more $R^{5b}$ may be respectively the same or different.

When a wet gel that is a condensation product of a sol containing a polysiloxane compound having the above structure or a hydrolysis product thereof (the wet gel formed from the sol) is used, an aerogel which has a low thermal conductivity coefficient and is flexible can be obtained further easily. From a similar viewpoint, characteristics shown below may be satisfied. Examples of $R^{1b}$ in Formula (B) include C1 to C6 alkyl groups and C1 to C6 alkoxy groups; and examples thereof specifically include a methyl group, a methoxy group and an ethoxy group. In Formula (B), $R^{2b}$ and $R^{3b}$ may be each independently a C1 to C6 alkoxy group. Examples of the alkoxy group include a methoxy group and an ethoxy group. In Formula (B), $R^{4b}$ and $R^{5b}$ may be each independently a C1 to C6 alkyl group or a phenyl group. The alkyl group may be a methyl group. In Formula (B), m may be 2 to 30, or may be also 5 to 20.

A polysiloxane compound having a structure expressed by Formula (B) may be obtained for example referring appropriately to production methods reported in JP 2000-26609 A, JP 2012-233110 A, etc.

Since an alkoxy group is hydrolyzable, it is possible that a polysiloxane compound having an alkoxy group exists in a sol as a hydrolysis product, therefore a polysiloxane compound having an alkoxy group and a hydrolysis product thereof may coexist. Further, in a polysiloxane compound having an alkoxy group, all of the alkoxy groups in the molecule may be hydrolyzed, or only part of them may be hydrolyzed.

Each of the polysiloxane compound having a hydrolyzable functional group or a condensable functional group, and a hydrolysis product of the polysiloxane compound having a hydrolyzable functional group may be used singly, or in a combination of 2 or more thereof.

Because good reactivity is more readily obtained, the content of the polysiloxane compound group contained in the above sol (the total sum of the content of the polysiloxane compound having a hydrolyzable functional group or a condensable functional group, and the content of a hydrolysis product of the polysiloxane compound having a hydrolyzable functional group) may be 1 part by mass or more, 3 parts by mass or more, 5 parts by mass or more, 7 parts by mass or more, or 10 parts by mass or more relative to the total amount of 100 parts by mass of the sol. Because good compatibility is more readily obtained, the content of the polysiloxane compound group may be 50 parts by mass or less, 30 parts by mass or less, or 15 parts by mass or less relative to the total amount of 100 parts by mass of the sol. Namely, the content of the polysiloxane compound group may be 1 to 50 parts by mass, 3 to 50 parts by mass, 5 to 50 parts by mass, 7 to 30 parts by mass, 10 to 30 parts by mass, or 10 to 15 parts by mass relative to the total amount of 100 parts by mass of the sol.

(Second Mode)

As a silicon compound having a hydrolyzable functional group or a condensable functional group, silicon compounds other than the polysiloxane compound may be used. Namely, the aerogel according to the Embodiment may be a dry product of a wet gel that is a condensation product of a sol containing at least one compound (hereinafter, occasionally referred to as a "silicon compound group") selected from the group consisting of a silicon compound having a hydrolyzable functional group or a condensable functional group (in the molecule) (excluding a polysiloxane compound), and a hydrolysis product of the silicon compound having a hydrolyzable functional group. The number of silicon atoms in the molecule of the silicon compound can be 1 or 2.

Examples of the silicon compound having a hydrolyzable functional group include, but should not be particularly limited to, alkyl silicon alkoxides. In these alkyl silicon alkoxides, the number of the hydrolyzable functional groups may be 3 or less, or 2 to 3 from the viewpoint of improving the water resistance. Examples of the alkyl silicon alkoxides include monoalkyltrialkoxysilanes, monoalkyldialkoxysilanes, dialkyldialkoxysilanes, monoalkylmonoalkoxysilanes, dialkylmonoalkoxysilanes, and trialkylmonoalkoxysilanes. Examples of the alkyl silicon alkoxides include methyltrimethoxysilane, methyldimethoxysilane, dimethyldimethoxysilane, and ethyltrimethoxysilane.

Examples of the silicon compound having a condensable functional group include, but should not be particularly limited to, silanetetraol, methylsilanetriol, dimethylsilanediol, phenylsilanetriol, phenylmethylsilanediol, diphenylsilanediol, n-propylsilanetriol, hexylsilanetriol, octylsilanetriol, decylsilanetriol, and trifluoropropylsilanetriol.

As silicon compounds having 3 or less hydrolyzable functional groups as well as a reactive group, vinyltrimethoxysilane, 3-glycidoxypropyltrimethoxysilane, 3-glycidoxypropylmethyldimethoxysilane, 3-methacryloxypropyltrimethoxysilane, 3-methacryloxypropylmethyldimethoxysilane, 3-acryloxypropyltrimethoxysilane, 3-mercaptopropyltrimethoxysilane, 3-mercaptopropylmethyldimethoxysilane, N-phenyl-3-aminopropyltrimethoxysilane, N-2-(aminoethyl)-3-aminopropylmethyldimethoxysilane and the like may be also used.

Further, as a silicon compound having a condensable functional group and having the previously mentioned reactive group, vinylsilanetriol, 3-glycidoxypropylsilanetriol, 3-glycidoxypropylmethylsilanediol, 3-methacryloxypropylsilanetriol, 3-methacryloxypropylmethylsilanediol, 3-acryloxypropylsilanetriol, 3-mercaptopropylsilanetriol, 3-mercaptopropylmethylsilanediol, N-phenyl-3-aminopropylsilanetriol, N-2-(aminoethyl)-3-aminopropylmethylsilanediol and the like may be also used.

Further, as silicon compounds having 3 or less hydrolyzable functional groups at a molecular terminal, bis(trimethoxysilyl)methane, bis(trimethoxysilyl)ethane, bis(trimethoxysilyl)hexane and the like may be also used.

Each of the silicon compound having a hydrolyzable functional group or a condensable functional group (excluding a polysiloxane compound), and a hydrolysis product of the silicon compound having a hydrolyzable functional group may be used singly, or in a combination of 2 or more thereof.

Because good reactivity is more readily obtained, the content of the silicon compound group contained in the above sol (the total sum of the content of the silicon compound having a hydrolyzable functional group or a condensable functional group (excluding a polysiloxane compound), and the content of a hydrolysis product of the silicon compound having a hydrolyzable functional group) may be 5 part by mass or more, 10 parts by mass or more, 12 parts by mass or more, 15 parts by mass or more, or 18 parts by mass or more relative to the total amount of 100 parts by mass of the sol. Because good compatibility is more readily obtained, the content of the silicon compound group may be 50 parts by mass or less, 30 parts by mass or less, 25 parts by mass or less, or 20 parts by mass or less relative to the total amount of 100 parts by mass of the sol. Namely, the content of the silicon compound group may be 5 to 50 parts by mass, 10 to 30 parts by mass, 12 to 30 parts by mass, 15 to 25 parts by mass, or 18 to 20 parts by mass relative to the total amount of 100 parts by mass of the sol.

Because good reactivity is more readily obtained, the total sum of the content of the polysiloxane compound group and the content of the silicon compound group may be 5 parts by mass or more, 10 parts by mass or more, 15 parts by mass or more, 20 parts by mass or more, or 22 parts by mass or more relative to the total amount of 100 parts by mass of the sol. Because good compatibility is more readily obtained, the total sum of the contents may be 50 parts by mass or less, 30 parts by mass or less, or 25 parts by mass or less relative to the total amount of 100 parts by mass of the sol. Namely, the total sum of the contents may be 5 to 50 parts by mass, 10 to 30 parts by mass, 15 to 30 parts by mass, 20 to 30 parts by mass, or 22 to 25 parts by mass relative to the total amount of 100 parts by mass of the sol.

The ratio of the content of the polysiloxane compound group to the content of the silicon compound group (polysiloxane compound group: silicon compound group) may be 1:0.5 to 1:4, 1:1 to 1:2, 1:2 to 1:4, or 1:3 to 1:4. Better compatibility is more readily obtained if the ratio of the contents of these compounds is 1:0.5 or more. The contraction of the gel is more readily suppressed if the above ratio of the contents is 1:4 or less.

(Third Mode)

An aerogel according to the Embodiment may have a structure expressed by the following Formula (1). An aerogel according to the Embodiment may have a structure expressed by the following Formula (1a) as a structure including the structure expressed by Formula (1). A structure expressed by Formula (1) and Formula (1a) may be introduced into the skeleton of an aerogel by using a polysiloxane compound having a structure expressed by the above Formula (A).

[Chemical Formula 4]

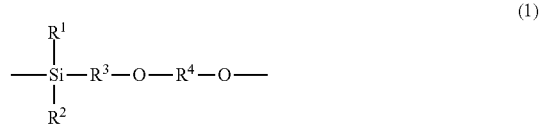

(1)

[Chemical Formula 5]

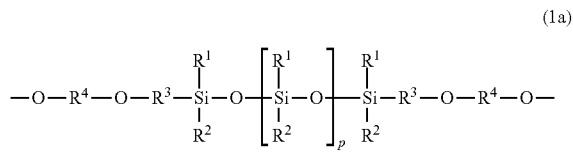

(1a)

In Formula (1) and Formula (1a), $R^1$ and $R^2$ each independently represent an alkyl group or an aryl group, and $R^3$ and $R^4$ each independently represent an alkylene group. In this case, examples of an aryl group include a phenyl group, and a substituted phenyl group. Examples of a substituent of a substituted phenyl group include an alkyl group, a vinyl group, a mercapto group, an amino group, a nitro group, and a cyano group. p represents an integer of 1 to 50. In Formula (1a), 2 or more $R^1$ may be respectively the same or different, and similarly, 2 or more $R^2$ may be respectively the same or different. In Formula (1a), 2 $R^3$ may be respectively the same or different, and similarly, 2 $R^4$ may be respectively the same or different.

When the structure expressed by the above Formula (1) or Formula (1a) is introduced into the skeleton of an aerogel, an aerogel which has a low thermal conductivity coefficient and is flexible may be readily obtained. From a similar viewpoint, characteristics shown below may be satisfied. In Formula (1) and Formula (1a), $R^1$ and $R^2$ may be each independently a C1 to C6 alkyl group or a phenyl group. The alkyl group may be a methyl group. In Formula (1) and Formula (1a), $R^3$ and $R^4$ may be each independently a C1 to C6 alkylene group. The alkylene group may be an ethylene group or a propylene group. In Formula (1a), p may be 2 to 30, or may also be 5 to 20.

(Fourth Mode)

The aerogel according to the Embodiment is an aerogel having a ladder structure comprising a strut and a bridge, and may be an aerogel in which a bridge has a structure represented by the following Formula (2). When such a ladder structure is introduced into the skeleton of an aerogel, the heat resistance and the mechanical strength can be readily improved. A ladder structure comprising a bridge having the structure expressed by Formula (2) may be introduced into the skeleton of an aerogel by using a polysiloxane compound having the structure expressed by the above Formula (B). In this regard, a "ladder structure" in the Embodiment is a structure having 2 struts and bridges connecting the struts together (structure with a so-called "ladder" shape). In the present mode, the skeleton of an aerogel may be configured with a ladder structure, or an aerogel may have a ladder structure only partly.

[Chemical Formula 6]

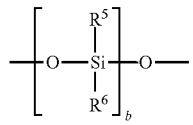

(2)

In Formula (2), $R^5$ and $R^6$ each independently represent an alkyl group or an aryl group, and b represents an integer of 1 to 50. Examples of the aryl group include a phenyl group, and a substituted phenyl group. Examples of a substituent of a substituted phenyl group include an alkyl group, a vinyl group, a mercapto group, an amino group, a nitro group, and a cyano group. Further, in Formula (2), in a case where b is an integer of 2 or higher, 2 or more $R^5$ may be respectively the same or different, and similarly 2 or more $R^6$ may be respectively the same or different.

When the structure is introduced into the skeleton of an aerogel, an aerogel having flexibility superior to, for example, an aerogel having a structure originated from a conventional ladder-form silsesquioxane (namely that having a structure expressed by the following Formula (X)) is obtained. In this regard, the structure of a bridge in an aerogel having a structure originated from a conventional ladder-form silsesquioxane is —O— as shown in the following Formula (X), however in an aerogel of the present mode, the structure of a bridge is a structure expressed by the Formula (2) (polysiloxane structure).

[Chemical Formula 7]

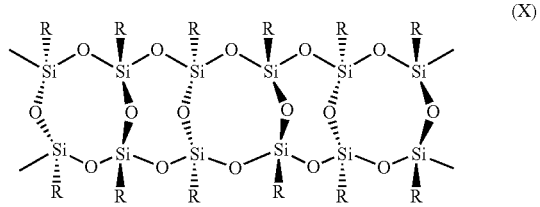

(X)

In Formula (X), R represents a hydroxy group, an alkyl group, or an aryl group.

Although there is no particular restriction on the structure to become a strut and the chain length thereof as well as the interval between the structures to become bridges, a ladder structure may have a ladder structure expressed by the following Formula (3) from the viewpoint of improvement of heat resistance and mechanical strength.

[Chemical Formula 8]

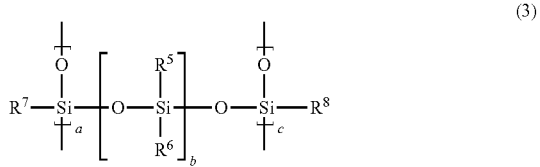

(3)

In Formula (3), $R^5$, $R^6$, $R^7$ and $R^8$ each independently represent an alkyl group or an aryl group, a and c each independently represent an integer of 1 to 3000, and b represents an integer of 1 to 50. In this case, examples of an aryl group include a phenyl group, and a substituted phenyl group. Examples of a substituent of a substituted phenyl group include an alkyl group, a vinyl group, a mercapto group, an amino group, a nitro group, and a cyano group. In Formula (3), in a case where b is an integer of 2 or higher, 2 or more $R^5$ may be respectively the same or different, and similarly 2 or more $R^6$ may be respectively the same or different. In Formula (3), in a case where a is an integer of 2 or higher, 2 or more $R^7$ may be respectively the same or different, and similarly in a case where c is an integer of 2 or higher, 2 or more $R^8$ may be respectively the same or different.

In Formula (2) and Formula (3), $R^5$, $R^6$, $R^7$ and $R^8$ (provided that $R^7$ and $R^8$ are limited to Formula (3)) each independently may be, for example, a C1 to C6 alkyl group or a phenyl group from the viewpoint of achieving superior flexibility. The alkyl group may be a methyl group. In Formula (3), a and c may be each independently 6 to 2000, or may be also 10 to 1000. In Formula (2) and Formula (3), b may be 2 to 30, or may be also 5 to 20.

(Fifth Mode)

The aerogel according to the Embodiment may contain silica particles. The sol that provides the aerogel may further contain silica particles. Namely, the aerogel according to the Embodiment may be a dry product of a wet gel that is a condensation product of a sol containing silica particles (it may be obtained by drying the wet gel formed from the sol). The aerogel layer may be a layer composed of a dry product of a wet gel that is a condensation product of a sol containing silica particles. Namely, the aerogel layer may be composed of a layer prepared by drying a wet gel formed from a sol containing silica particles. It should be noted that the aerogel described above may also be a dry product of a wet gel that is a condensation product of a sol containing silica particles (it may be obtained by drying the wet gel formed from the sol) as described above.

The silica particles can be used without limitation in particular, and examples thereof include amorphous silica particles. Examples of the amorphous silica particles include fused silica particles, fumed silica particles, and colloidal silica particles. Among these, colloidal silica particles have high monodispersity to readily suppress the aggregation thereof in the sol.

The shapes of the silica particles are not particularly limited; examples thereof include spherical, cocoon shaped, and associated form. Among these, by using spherical particles as the silica particles, the aggregation thereof in the sol is readily suppressed. The average primary particle diameter of the silica particles can be 1 nm or more, may be 5 nm or more, or may be 10 nm or more because appropriate strength is readily given to the aerogel and an aerogel superior in resistance to contraction during drying is obtained more easily. On the other hand, the average primary particle diameter of the silica particles can be 500 nm or less, may be 300 nm or less, or may be 250 nm or less because the solid heat conduction of the silica particles is readily suppressed and an aerogel having high thermal insulation properties is readily obtained. Namely, the average primary particle diameter of the silica particles can be 1 to 500 nm, may be 5 to 300 nm, or may be 10 to 250 nm.

An average primary particle diameter of a silica particle of the Embodiment may be obtained by observing directly a cross-section of an aerogel layer using a scanning electron microscope (hereinafter abbreviated as "SEM"). For example, an individual particle diameter of a silica particle may be obtained from a three-dimensional network skeleton based on the diameter of a cross-section thereof. The term "diameter" referred to above means a diameter of a cross-section of a skeleton configuring a three-dimensional network skeleton, wherein the cross-section is deemed as a circle. In this regard, the diameter of a cross-section deemed as a circle means the diameter of a circle having the same area as the area of a cross-section. In determining an average particle diameter, the circle diameters of 100 particles are measured and averaged.

Figure 3:
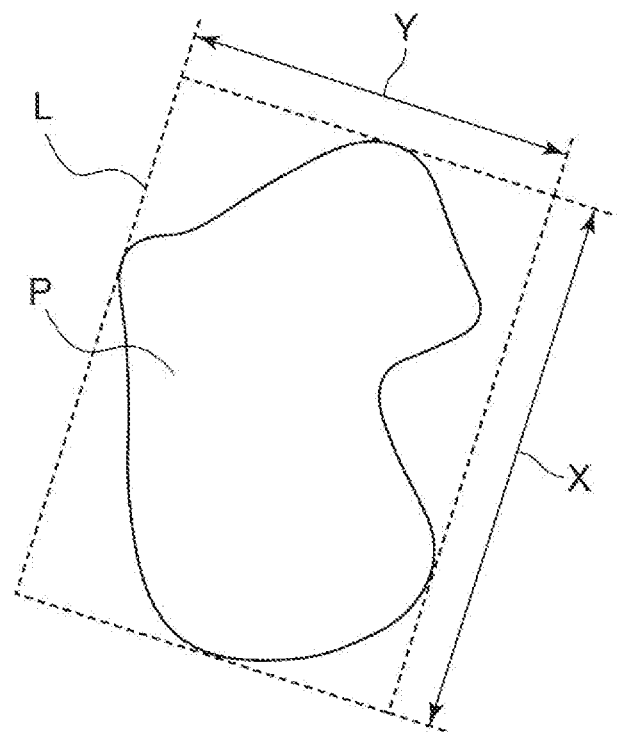
FIG. 3 is a diagram illustrating a method for calculating a biaxial average primary particle diameter of a particle.

Moreover, the average particle diameter can be measured from the silica particles as a raw material before the aerogel layer is formed. For example, a biaxial average primary particle diameter may be determined from the results of observation of optional 20 particles using a SEM as follows. Namely, taking a colloidal silica particle, which is ordinarily dispersed in water at a solid concentration of 5 to 40 mass %, as an example, a wafer with a pattern wiring is cut to a 2 cm square chip, the chip is dipped in a dispersion of a colloidal silica particle for approx. 30 sec, then rinsed with pure water for approx. 30 sec and dried by a nitrogen blow. Thereafter the chip is mounted on a sample stage for SEM observation, and a silica particle is observed at a magnification of 100000× by applying an acceleration voltage of 10 kV and an image is recorded. From the obtained image, 20 silica particles are randomly selected, and an average of the particle diameters of the particles is defined as the average particle diameter. In this case if a selected silica particle has a shape as shown in FIG. 3, a rectangle, which circumscribes the silica particle P and is placed to have a longest long side, (circumscribed rectangle L), is constructed. Putting the long side of the circumscribed rectangle L as X, and the short side as Y, a biaxial average primary particle diameter is calculated as (X+Y)/2, which is defined as the particle diameter of the particle.

Because an aerogel superior in resistance to contraction during drying is obtained more easily, the number of silanol groups per 1 g of silica particles can be $10\times10^{18}$/g or more, may be $50\times10^{18}$/g or more, or may be $100\times10^{18}$/g or more. Because a homogeneous aerogel is readily obtained, the number of silanol groups per 1 g of silica particles can be $1000\times10^{18}$/g or less, may be $800\times10^{18}$/g or less, or may be $700\times10^{18}$/g or less. Namely, the number of silanol groups per 1 g of silica particles can be $10\times10^{18}$ to $1000\times10^{18}$/g, may be $50\times10^{1}$ to $800\times10^{18}$/g, or may be $100\times10^{18}$ to $700\times10^{18}$/g.

Because appropriate strength is readily given to the aerogel and an aerogel superior in resistance to contraction during drying is obtained more easily, the content of the silica particles contained in the above sol can be 1 part by mass or more, and may be 4 parts by mass or more relative to the total amount of 100 parts by mass of the sol. Because the solid heat conduction of the silica particles is readily suppressed and an aerogel having high thermal insulation properties is readily obtained, the content of the silica particles contained in the above sol can be 20 parts by mass or less, 15 parts by mass or less, 12 parts by mass or less, 10 parts by mass or less, or 8 parts by mass or less. Namely, the content of the silica particles may be 1 to 20 parts by mass, 4 to 15 parts by mass, 4 to 12 parts by mass, 4 to 10 parts by mass, or 4 to 8 parts by mass relative to the total amount of 100 parts by mass of the sol.

(Other Modes)

An aerogel according to the Embodiment may have a structure expressed by the following Formula (4). While containing silica particles, the aerogel according to the Embodiment can have a structure represented by the following Formula (4).

[Chemical Formula 9]

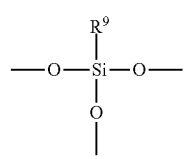

(4)

In Formula (4), $R^9$ represents an alkyl group. Examples of the alkyl group include a C1 to C6 alkyl group, and examples thereof specifically include a methyl group.

The aerogel according to the Embodiment may have a structure expressed by the following Formula (5). While containing silica particles, the aerogel according to the Embodiment can have a structure represented by the following Formula (5).

[Chemical Formula 10]

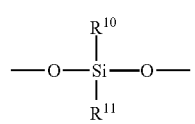

(5)

In Formula (5), $R^{10}$ and $R^{11}$ each independently represent an alkyl group. Examples of the alkyl group include a C1 to C6 alkyl group, and examples thereof specifically include a methyl group.

The aerogel according to the Embodiment may have a structure expressed by the following Formula (6). While containing silica particles, the aerogel according to the Embodiment can have a structure represented by the following Formula (6).

[Chemical Formula 11]

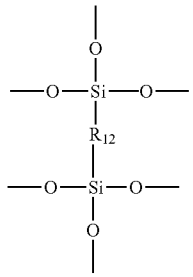

(6)

In Formula (6), $R^{12}$ represents an alkylene group. Examples of the alkylene group include a C1 to C10 alkylene group, and examples thereof specifically include an ethylene group, and a hexylene group.

The aerogel according to the Embodiment may have a structure derived from polysiloxane. Examples of the structure derived from polysiloxane include a structure represented by the above Formulae (1), (2), (3), (4), (5) or (6). The aerogel according to the Embodiment may have at least one among the structures represented by the above Formulae (4), (5) and (6) without containing silica particles. Namely, the aerogel layer according to the Embodiment may be composed of a layer containing an aerogel having a structure derived from polysiloxane. Examples of the structure derived from polysiloxane include a structure represented by the above Formulae (1), (2), (3), (4), (5) or (6). Accordingly, the aerogel according to the Embodiment may have at least one among the structures represented by the above Formulae (4), (5) and (6) without containing silica particles.

Because good thermal insulation properties are readily obtained, the thickness of the aerogel layer can be 1 μm or more, may be 10 μm or more, or may be 30 μm or more. On the other hand, from the viewpoint of a reduction in thickness, the thickness of the aerogel layer can be 200 μm or less, may be 100 μm or less, or may be 80 μm or less. Namely, the thickness of the aerogel layer can be 1 to 200 μm, may be 10 to 100 μm, or may be 30 to 80 μm.

From the viewpoint of obtaining higher strength and flexibility, the density at 25° C. of the aerogel layer can be 0.05 g/cm³ or more, may be 0.1 g/cm³ or more, or may be 0.2 g/cm³ or more. On the other hand, from the viewpoint of obtaining higher thermal insulation properties, the density at 25° C. of the aerogel layer can be 0.3 g/cm³ or less, may be 0.25 g/cm³ or less, or may be 0.2 g/cm³ or less. Namely, the density at 25° C. of the aerogel layer can be 0.05 to 0.3 g/cm³, may be 0.1 to 0.25 g/cm³, or may be 0.1 to 0.2 g/cm³.

From the viewpoint of obtaining higher thermal insulation properties, the porosity at 25° C. of the aerogel layer can be 85% or more, or may be 87% or more; from the viewpoint of obtaining higher strength and flexibility, the porosity at 25° C. of the aerogel layer can be 95% or less, or may be 93% or less. Namely, the porosity at 25° C. of the aerogel layer can be 85 to 95%6, or may be 87 to 93%.

The density and porosity of the aerogel layer can be measured by mercury intrusion porosimetry according to DIN66133. As a measurement apparatus, AutoPore IV9520 (made by SHIMADZU Corporation, product name) can be used, for example.

<Support Having Heat Ray Reflective Function or Heat Ray Absorbing Function>

The support according to the Embodiment has at least one layer which is a non-aerogel layer and has a heat ray reflective function or a heat ray absorbing function. The heat ray reflective function refers to a function in which reflection of light at about 800 to 3000 nm in the near-infrared or infrared region, for example, is larger than absorption and transmission of the light. In contrast, the heat ray absorbing function refers to a function in which absorption of light at about 800 to 3000 nm in the near-infrared or infrared region, for example, is larger than reflection and transmission of the light. Here, the reflection of light includes scattering of light.

The configuration of the support is not particularly limited, and may be a single layer or a multi-layer. The support is composed of at least one of a layer having a heat ray reflective function and a layer having a heat ray absorbing function, and may be composed of only the layer having a heat ray reflective function or only the layer having a heat ray absorbing function. Moreover, the support may be a laminate of the layer having a heat ray reflective function and the layer having a heat ray absorbing function. Furthermore, the support may be a laminate of the heat ray reflective function or layer having a heat ray absorbing function and a layer not having a heat ray reflective function or a heat ray absorbing function. In this case, the layer having a heat ray reflective function or a heat ray absorbing function may be formed one or both surfaces of the layer not having the heat ray reflective function or the heat ray absorbing function. The shape of the support can be a film shape because it can give light-weightness to the aerogel laminate.

The layer having a heat ray reflective function can contain a heat ray-reflective material. The heat ray-reflective material is not particularly limited as long as it is a material reflecting light in the near-infrared or infrared region. Examples of the heat ray-reflective material include aluminum compounds such as aluminum and aluminum oxide; zinc compounds such as zinc aluminate; magnesium compounds such as hydrotalcite; silver compounds such as silver; titanium compounds such as titanium, titanium oxide and strontium titanate; copper compounds such as copper and bronze; stainless steel; nickel; tin; microballoons such as Shirasuballoons; and ceramic balloons. These may be used along or in combination.

Among these, from the viewpoint of readily reducing the thermal conductivity and having low cost and high handling properties, a material containing aluminum, magnesium, silver or titanium can be used as the heat ray-reflective material.

The layer having a heat ray reflective function may be composed of a metal foil such as an aluminum foil or a copper foil. Moreover, the layer having a heat ray reflective function may be a resin film produced by kneading an aluminum paste or titanium oxide with a resin such as polyolefin, polyester, polycarbonate or polyimide. Furthermore, the layer having a heat ray reflective function may be a deposition film in which aluminum or silver is deposited on a resin film of polyolefin, polyester, polycarbonate, polyimide, or the like by physical deposition such as sputtering or vacuum deposition or chemical deposition.

The layer having a heat ray absorbing function can contain a heat ray-absorbing material. The heat ray-absorbing material is not particularly limited as long as it is a substance which absorbs light in the near-infrared or infrared region. Examples of the heat ray-absorbing material include carbon graphite such as flaky graphite, earthy graphite and artificial graphite, carbon powder such as carbon black; metal sulfates such as barium sulfate, strontium sulfate, calcium sulfate, mercallite ($KHSO_4$), halotrichite, alunite, and jarosite; antimony compounds such as antimony trioxide; metal oxides such as tin oxide, indium oxide, indium oxide tin, zinc oxide, and anhydrous zinc antimonate oxide; ammonium-based, urea-based, iminium-based, aminium-based, cyanine-based, polymethine-based, anthraquinone-based, dithiol-based, copper ion-based, phenylenediamine-based, phthalocyanine-based, benzotriazole-based, benzophenone-based, oxanilide-based, cyanoacrylate-based, or benzotriazole-based dyes or pigments.

Among these, a material containing carbon graphite, carbon black, a metal sulfate, or an antimony compound can be used as the heat ray-absorbing material from the viewpoint of readily reducing the thermal conductivity and having low cost and high handling properties. From the viewpoint of further reducing the thermal conductivity, the layer having a heat ray absorbing function may be a resin film produced by kneading carbon black, antimony oxide, or barium sulfate.

From the viewpoint of further enhancing the thermal insulation properties, the support can have a layer composed of a material containing at least one selected from the group consisting of carbon graphite, aluminum, magnesium, silver, titanium, carbon black, metal sulfates, and antimony compounds. From the viewpoint of having high handling properties and enhancing the thermal insulation properties, the support may be an aluminum foil, an aluminum deposited film, a silver deposited film, or an antimony oxide containing film.

The support may have a resin layer for the purpose of an enhancement in adhesiveness with the aerogel layer or protection. Examples of the material forming the resin layer include urethane resins, polyester resins, acrylic resins, and phenol resins. These resin layers may be a single layer or may be a multi-layer.

The surface of the support on which the aerogel layer is not laminated may be subjected to a releasing treatment.

The thickness of the support is not particularly limited; from the viewpoint of the handling properties, the thickness can be 3 µm or more, may be 5 µm or more, or may be 7 µm or more. On the other hand, from the viewpoint of enhancing the thermal insulation properties, the thickness of the support can be 100 µm or less, may be 80 µm or less, or may be 50 µm or less. Namely, the thickness of the support can be 3 to 100 µm, may be 5 to 80 µm, or may be 7 to 50 µm.

<Method of Producing Aerogel Laminated Composite>

The method of producing the aerogel laminated composite according to the Embodiment is not particularly limited, and the aerogel laminated composite according to the Embodiment can be produced by the following method, for example.

The aerogel laminated composite according to the Embodiment can be produced by performing the first step of producing an aerogel laminate in which the aerogel layer 2 and the support 3 are laminated, followed by the second step of laminating the porous spacer layer 1 onto the aerogel layer 2 of the aerogel laminate.

[First Step]

The aerogel laminate according to the Embodiment can be produced by a production method mainly including a step of preparing a sol of producing a sol for forming an aerogel, an applying step of applying the sol obtained in the step of preparing a sol to a support having a heat ray reflective function or a heat ray absorbing function, and drying the sol to form an aerogel layer, an aging step of aging the aerogel layer obtained in the applying step, a step of washing the aged aerogel layer and performing solvent exchange, and a drying step of drying the aerogel layer washed and subjected to solvent exchange (when necessary). The "sol" in the Embodiment refers to a state before a gelation reaction occurs where silicon compound group described above, polysiloxane compound group in some cases, and the silica particles are dissolved or dispersed in a solvent.

Each step for producing an aerogel laminate according to the first step will be described below.

(Step of Preparing Sol)

The step of preparing a sol is a step of mixing, for example the silicon compound with a solvent containing silica particles in some cases to perform a hydrolysis reaction, and performing a sol gel reaction to obtain a semi-gelated sol coating solution. In this step, an acid catalyst may be further added in a solvent for promoting the hydrolysis reaction. Further, a surfactant, a thermally hydrolyzable compound, etc. may be also added in a solvent as disclosed in JP 5250900 B. Furthermore, a base catalyst may be added to promote the gelation reaction. The silica particles may be contained in the sol from the viewpoint of reducing the time taken in this step, and the applying step and the aging step described later to reduce the heating and drying temperatures.

The solvent is not particularly limited in the applying step described later as long as good coating properties are obtained; for example, water, or a mixed solution of water and alcohol can be used.

Examples of an alcohol include methanol, ethanol, n-propanol, 2-propanol, n-butanol, 2-butanol, and t-butanol. Among these, water can be used because the surface tension is high and the volatility is low.

Examples of an acid catalyst include an inorganic acid, such as hydrofluoric acid, hydrochloric acid, nitric acid, sulfuric acid, sulfurous acid, phosphoric acid, phosphorous acid, hypophosphorous acid, bromic acid, chloric acid, chlorous acid, and hypochlorous acid; an acidic phosphate, such as acidic aluminum phosphate, acidic magnesium phosphate, and acidic zinc phosphate; and an organic carboxylic acid, such as acetic acid, formic acid, propionic acid, oxalic acid, malonic acid, succinic acid, citric acid, malic acid, adipic acid, and azelaic acid. Among them, as an acid catalyst for further improving the water resistance of an obtained aerogel layer, an organic carboxylic acid can be used, specific examples of the organic carboxylic acid include acetic acid, formic acid, propionic acid, oxalic acid or malonic acid, and the organic carboxylic acid may be acetic acid. They may be used singly, or in a combination of 2 or more thereof.

When an acid catalyst is used, a hydrolysis reaction of a silicon compound is promoted, and a sol may be obtained in a shorter time.

The addition amount of an acid catalyst with respect to the total amount of a silicon compound as 100 parts by mass may be 0.001 to 0.1 part by mass.

As a surfactant a nonionic surfactant, an ionic surfactant, etc. may be used. The surfactants may be used singly, or in a combination of 2 or more thereof.

As a nonionic surfactant, for example, a compound comprising a hydrophilic moiety such as polyoxyethylene and a hydrophobic moiety composed mainly of an alkyl group, or a compound comprising a hydrophilic moiety such as polyoxypropylene may be used. Examples of a compound comprising a hydrophilic moiety such as polyoxyethylene and a hydrophobic moiety composed mainly of an alkyl group include polyoxyethylene nonylphenyl ether, polyoxyethylene octylphenyl ether, and polyoxyethylene alkyl ether. Examples of a compound comprising a hydrophilic moiety such as polyoxypropylene include polyoxypropylene alkyl ether, and a block copolymer of polyoxyethylene and polyoxypropylene.

As an ionic surfactant, a cationic surfactant, an anionic surfactant, an amphoteric surfactant, and the like can be used. Examples of the cationic surfactant include cetyltrimethylammonium bromide and cetyltrimethylammonium chloride. Examples of an anionic surfactant include sodium dodecyl sulfonate. Examples of an amphoteric surfactant include an amino acid surfactant, a betaine surfactant, and an amine oxide surfactant. Examples of an amino acid surfactant include acylglutamic acid. Examples of a betaine surfactant include lauryldimethylaminoacetic acid betaine, and stearyldimethylaminoacetic acid betaine. Examples of an amine oxide surfactant include lauryldimethylamine oxide.

It is conceived that such a surfactant acts to suppress phase separation by reducing a difference in a chemical affinity between a solvent in a reaction system and a growing siloxane polymer in an applying step described below.

Although the addition amount of a surfactant depends on the type of a surfactant, and the type and amount of a silicon compound (a silicon compound group and a polysiloxane compound group), it may be for example 1 to 100 parts by mass with respect to the total amount of a silicon compound as 100 parts by mass, and may be also 5 to 60 parts by mass.

It is conceived that a thermally hydrolyzable compound generates a base catalyst by thermal hydrolysis to make a reaction solution basic, thereby promoting a sol-gel reaction. Therefore, there is no particular restriction on the thermally hydrolyzable compound, insofar as it is a compound able to make a reaction solution basic after hydrolysis, and examples thereof include urea; an acid amide such as formamide, N-methylformamide, N,N-dimethylformamide, acetamide, N-methylacetamide and N,N-dimethylacetamide; and a cyclic nitrogen compound such as hexamethylenetetramine. Among them, especially urea is apt to achieve the above promotion effect.

There is no particular restriction on the addition amount of a thermally hydrolyzable compound, insofar as it is an amount sufficient to promote thoroughly a sol-gel reaction. For example, when urea is used as a thermally hydrolyzable compound, its addition amount may be 1 to 200 parts by mass with respect to the total amount of a silicon compound as 100 parts by mass, and may be also 2 to 150 parts by mass. When the addition amount is 1 part by mass or more, excellent reactivity may be obtained more easily. When the addition amount is 200 parts by mass or less, precipitation of a crystal and decrease in a gel density may be suppressed more easily.

Hydrolysis in a step of preparing a sol may be carried out, for example, in a temperature environment of 20 to 60° C. for 10 min to 24 hours, or may be carried out in a temperature environment of 50 to 60° C. for 5 min to 8 hours, subject to the type and quantity of a silicon compound, a silica particle, an acid catalyst, a surfactant, or the like in a mixture liquid. By this means, hydrolyzable functional groups in a silicon compound are hydrolyzed adequately, so that a hydrolysis product compound of a silicon compound can be obtained more surely.

In a case where a thermally hydrolyzable compound is added into a solvent, the temperature environment of a step of preparing a sol may be adjusted to a temperature at which hydrolysis of the thermally hydrolyzable compound is suppressed and gelation of a sol is suppressed. Such a temperature is optional insofar as hydrolysis of a thermally hydrolyzable compound is suppressed at the temperature. For example, in a case where urea is used as a thermally hydrolyzable compound, the temperature environment of a step of preparing a sol may be 0 to 40° C., or also 10 to 30° C.

Examples of a base catalyst include an alkali metal hydroxide, such as lithium hydroxide, sodium hydroxide, potassium hydroxide, and cesium hydroxide; an ammonium compound, such as ammonium hydroxide, ammonium fluoride, ammonium chloride, and ammonium bromide; a basic sodium phosphate salt such as sodium metaphosphate, sodium pyrophosphate, and sodium polyphosphate; an aliphatic amine such as allylamine, diallylamine, triallylamine, isopropylamine, diisopropylamine, ethylamine, diethylamine, triethylamine, 2-ethylhexylamine, 3-ethoxypropylamine, diisobutylamine, 3-(diethylamino)propylamine, di-2-ethylhexylamine, 3-(dibutylamino)propylamine, tetramethylethylenediamine, t-butylamine, sec-butylamine, propylamine, 3-(methylamino)propylamine, 3-(dimethylamino)propylamine, 3-methoxyamine, dimethylethanolamine, methyldiethanolamine, diethanolamine, and triethanolamine; and a nitrogen-containing heterocyclic compound such as morpholine, N-methylmorpholine, 2-methylmorpholine, piperazine and its derivative, piperidine and its derivative, and imidazole and its derivative. Among them, ammonium hydroxide (ammonia water) is superior, because it has high volatility so that it hardly remains in an aerogel layer after drying hard to impair the water resistance, and further because it is economical. The base catalyst may be used singly, or in a combination of 2 or more thereof.

By using a base catalyst, a dehydration condensation reaction and/or a dealcoholization condensation reaction, of any of silicon compound (polysiloxane compound group and silicon compound group) and a silica particle in a sol may be promoted such that gelation of the sol is performed in a shorter time. Especially ammonia is highly volatile and hardly remains in an aerogel layer, therefore when ammonia is used as a base catalyst, an aerogel layer with improved water resistance may be obtained.

The addition amount of a base catalyst may be 0.5 to 5 parts by mass, or may be also 1 to 4 parts by mass with respect to the total amount of silicon compound (polysiloxane compound group and silicon compound group) as 100 parts by mass. When the addition amount of a base catalyst is 0.5 part by mass or more, gelation can be carried out in a shorter time. When the addition amount of a base catalyst is 5 parts by mass or less, decrease in water resistance may be further suppressed.

The sol needs to be in a semi-gelated state in the sol gel reaction of the step of preparing a sol for the purpose of obtaining good coating properties in the applying step described later. It is preferred that this reaction be performed in a tightly closed container such that the solvent and the base catalyst do not volatilize. Although the gelation temperature varies according to the types and the amounts of the silicon compound, the polysiloxane compound, the silica particles, the acid catalyst, the surfactant, base catalyst, and the like in the sol, the gelation temperature can be 30 to 90° C., and may be 40 to 80° C. If the gelation temperature is controlled to be 30° C. or more, the gelation can be performed in a shorter time, and if the gelation temperature is controlled to be 90° C. or less, rapid gelation can be suppressed.

Although the time for the sol gel reaction varies according to the gelation temperature, the gelation time can be shortened compared to the sol used in conventional aerogels in the case where the silica particles are contained in the sol in the Embodiment. This reason is inferred as follows: the silanol groups and/or reactive groups in silicon compound (polysiloxane compound group and silicon compound group) in the sol form hydrogen bonds and/or chemical bonds with the silanol groups in the silica particles. The gelation time can be 10 to 360 minutes, and may be 20 to 180 minutes. By controlling the gelation time to be 10 minutes or more, the viscosity of the sol is enhanced to readily obtaining good applicability in the applying step described later, and by controlling the gelation time to be 360 minutes or less, the complete gelation of the sol is suppressed to readily obtain the adhesiveness to the support, which is a non-aerogel layer.

(Applying Step)

The applying step is a step of applying the semi-gelated sol coating solution obtained in the above step of preparing a sol to a support to form an aerogel layer. Specifically, by applying the above sol coating solution to the support, and drying sol coating solution, the sol coating solution is gelated to form an aerogel layer on the surface of the support. It is desirable that the adhesive force of the aerogel layer to the support be ensured. The aerogel laminate according to the Embodiment can be wound into a roll to be stored.

As an applicator, a die coater, a commna coater, a bar coater, a kiss coater, a roll coater, or the like can be used, and is appropriately used according to the thickness of the aerogel layer. The coating after the sol coating solution is applied can be dried by heating or the like.

The drying of the sol coating solution after applied to the support can be performed on the condition such that the moisture content of the aerogel layer after drying is 10% by mass or more, and the drying may be performed on, for example, the condition such that the moisture content of the aerogel layer after drying is 50% by mass or more. If the moisture content of the aerogel layer is controlled to be 10% by mass, the adhesiveness to the support is readily obtained.

Although the drying temperature varies according to the moisture content and/or the amount of the organic solvent in the sol coating solution and the boiling point of the organic solvent, the drying temperature can be 50 to 150° C., for example, and may be 60 to 120° C. By controlling the drying temperature to be 50° C. or more, the gelation can be performed in a shorter time, and by controlling the drying temperature to be 150° C. or less, the adhesiveness to the support is readily obtained.

Although the drying time varies according to the drying temperature, the drying time can be 0.2 to 10 minutes, for example, and may be 0.5 to 8 minutes. By controlling the drying time to be 0.2 minutes or more, the aerogel layer is readily formed, and by controlling the drying time to be 10 minutes or less, the adhesiveness to the support is readily obtained. The above drying condition can be appropriately set preliminarily by a simple test.

Moreover, a separator can be further laminated on the surface of the aerogel layer opposite to the support. By laminating the separator, the transfer of the above aerogel surface to the rear surface of the support when the aerogel laminate is wound into a roll can be prevented. In the case where the separator is laminated, in the applying step, for example, the separator may be laminated after the sol coating solution is applied, or may be laminated after the coating formed of the sol coating solution is dried. Examples of the separator include resin films composed of resins such as polyolefin, polyester, polycarbonate, and polyimide, metal foils such as copper foil and aluminum foil, and releasing paper. Among these, a resin film can be used from the viewpoint of keeping the moisture content of the aerogel layer high, if the separator is laminated after the sol coating solution is applied. The separator may be subjected to a releasing treatment such as a matting treatment or a corona treatment.

(Aging Step)

The aging step is a step of aging the aerogel layer, which is formed by the above applying step, through heating. In this step, from the viewpoint of suppressing a reduction in the adhesiveness of the aerogel layer to the support, it is preferred that the aerogel layer be aged such that the moisture content of the aerogel layer be 10% by mass or more, and it is more preferred that the aerogel layer be aged such that the moisture content of the aerogel layer be 50% by mass or more. The aging method is not particularly limited as long as the above range is satisfied; examples thereof include a method of aging an aerogel laminate in a sealed atmosphere, and a method of aging using a thermohygrostat which can suppress a reduction in moisture content caused by heating.

The aging temperature can be 40 to 90° C., for example, and may be 50 to 80° C. By controlling the aging temperature to be 40° C. or more, the aging time can be shortened. By controlling the aging temperature to be 90° C. or less, a reduction in the moisture content can be suppressed.

The aging time can be 1 to 48 hours, for example, and may be 3 to 24 hours. By controlling the aging time to be one hour or more, further high thermal insulation properties can be obtained. By controlling the aging time to be 48 hours or less, high adhesiveness to the support can be obtained.

(Step of Washing and Solvent Exchange)

The washing and solvent exchange step has a step of washing the aerogel laminate obtained in the above aging step (washing step) and a step of exchanging the solvent for a solvent suitable for the drying step described later (solvent exchange step). The method of washing and solvent exchange is not particularly limited. Although the washing and solvent exchange step can be implemented in the form of performing only the solvent exchange step without performing the step of washing the aerogel laminate, the aerogel layer after aging may be washed from the viewpoint of reducing impurities such as unreacted substances and by-products in the aerogel layer to enable production of an aerogel laminate having higher purity.

In the washing step, the aerogel layer in the aerogel laminate obtained in the above aging step can be repeatedly washed using water or an organic solvent.

As an organic solvent, various organic solvents, such as methanol, ethanol, 1-propanol, 2-propanol, 1-butanol, acetone, methyl ethyl ketone, 1,2-dimethoxyethane, acetonitrile, hexane, toluene, diethyl ether, chloroform, ethyl acetate, tetrahydrofuran, methylene chloride, N,N-dimethylformamide, dimethyl sulfoxide, acetic acid and formic acid, may be used. The organic solvents may be used singly, or in a combination of 2 or more thereof.

In a solvent exchange step described below, a low surface tension solvent may be used for suppressing contraction of an aerogel layer by drying. However, a low surface tension solvent has in general extremely low mutual solubility with water. Therefore, when a low surface tension solvent is used in a solvent exchange step, it is preferred that the organic solvent used in a washing step is a hydrophilic organic solvent having high mutual solubility with respect to both water and the low surface tension solvent. In this regard, a hydrophilic organic solvent used in a washing step can perform a function of preliminary exchange for a solvent exchange step. For this reason, among these organic solvents described above, hydrophilic organic solvents such as methanol, ethanol, 2-propanol, acetone, and methyl ethyl ketone can be used; furthermore, methanol, ethanol or methyl ethyl ketone may be used from the viewpoint of economy.

The amount of water or an organic solvent used in a washing step can be an amount enough to exchange the solvent in the aerogel layer, and to wash; the solvent can be used in an amount 3 to 10 times the volume of the aerogel layer. Washing may be repeated until the water content in an aerogel layer after washing reaches 10 mass % or less.

The temperature in a washing step may be not higher than the boiling point of a solvent used for washing, and for example in a case where methanol is used, it may be between approx. 30 and 60° C.

To suppress contraction of the aerogel layer in the drying step described later, the solvent contained in the washed aerogel layer is exchanged for a predetermined exchange solvent in the solvent exchange step. In this case, the exchange efficiency may be enhanced by raising the temperature. Specific examples of an exchange solvent, in a case where drying is performed in a step of drying at the atmospheric pressure and at a temperature less than a critical point of a solvent used for drying, include a low surface tension solvent described below. On the other hand, in the case where supercritical drying is performed, ethanol, methanol, 2-propanol, dichlorodifluoromethane or carbon dioxide may be used singly or in combinations of 2 or more as the exchange solvent, for example.

Examples of a low surface tension solvent include a solvent having a surface tension of 30 mN/m or less at 20° C. The surface tension may be also 25 mN/m or less, or even 20 mN/m or less. Examples of a low surface tension solvent include an aliphatic hydrocarbon, such as pentane (15.5), hexane (18.4), heptane (20.2), octane (21.7), 2-methylpentane (17.4), 3-methylpentane (18.1), 2-methylhexane (19.3), cyclopentane (22.6), cyclohexane (25.2), and 1-pentene (16.0); an aromatic hydrocarbon, such as benzene (28.9), toluene (28.5), m-xylene (28.7), and p-xylene (28.3); a halogenated hydrocarbon, such as dichloromethane (27.9), chloroform (27.2), carbon tetrachloride (26.9), 1-chloropropane (21.8), and 2-chloropropane (18.1); an ether, such as ethyl ether (17.1), propyl ether (20.5), isopropyl ether (17.7), butyl ethyl ether (20.8), and 1,2-dimethoxyethane (24.6); a ketone, such as acetone (23.3), methyl ethyl ketone (24.6), methyl propyl ketone (25.1), and diethyl ketone (25.3); and an ester, such as methyl acetate (24.8), ethyl acetate (23.8), propyl acetate (24.3), isopropyl acetate (21.2), isobutyl acetate (23.7), and ethyl butyrate (24.6). A number in parentheses means a surface tension at 20° C. in unit [mN/m]. Among them, an aliphatic hydrocarbon (such as hexane and heptane) has a low surface tension, and is superior in work environmental property. Further, when a hydrophilic organic solvent, such as acetone, methyl ethyl ketone and 1,2-dimethoxyethane, among the above solvents is used, it may have also a function of an organic solvent for the washing step. Further, among the above solvents, a solvent with a boiling point at a normal pressure of 100° C. or less may be also used, because drying in a step of drying described below is easy. The solvents may be used singly, or in a combination of 2 or more thereof.

The amount of the solvent used in the solvent exchange step can be an amount such that the solvent in the washed aerogel layer can be sufficiently exchanged, and the solvent can be used in an amount 3 to 10 times the volume of the aerogel layer.

The temperature in a solvent exchange step may be not higher than the boiling point of a solvent used for exchange, and for example in a case where heptane is used, it may be between approx. 30 and 60° C.

In the Embodiment, in the case where the sol contains silica particles, the solvent exchange step is not always essential as described above. A mechanism is conjectured as follows. According to the Embodiment a silica particle functions as a support for a three-dimensional network skeleton of the aerogel, and as a result, the skeleton is supported such that contraction of a gel in a step of drying is suppressed. Consequently, it is conceivable that a gel can be subjected to a step of drying as it is without exchanging a solvent used for washing. As described above, in the Embodiment, a step of washing and solvent exchange through a step of drying may be simplified in the case where the sol contains silica particles.

Moreover, in the case where the separator is laminated in the applying step, from the viewpoint of enhancing the washing and solvent exchange efficiency of the aerogel layer, the separator may be removed before the washing step, and may be again laminated after the solvent exchange step.

(Step of Drying)

In a step of drying, an aerogel layer subjected to washing and (according to need) solvent exchange as described above is dried. Thereby, the final aerogel laminate can be obtained.

The drying method is not particularly limited, and known normal pressure drying, supercritical drying, or freeze-drying can be used. Among these, normal pressure drying or supercritical drying can be used from the viewpoint of readily producing an aerogel layer having low density. Also, from the viewpoint that production at a low cost is possible, normal pressure drying may be applied. "Normal pressure" in the Embodiment means 0.1 MPa (atmospheric pressure).

The aerogel laminate according to the Embodiment can be obtained by drying the aerogel layer subjected to washing and (when necessary) solvent exchange at a temperature less than the critical point of the solvent used in drying under atmospheric pressure. Although the drying temperature varies according to the type of the exchanged solvent (the solvent used in washing in the case where solvent exchange is not performed) or the heat resistance of the support, the drying temperature can be 60 to 180° C., and may be 90 to 150° C. Although the drying time varies according to the volume of the aerogel layer and the drying temperature, the drying time can be 2 to 48 hours. In the Embodiment, the drying can be accelerated by applying pressure in a range not inhibiting the productivity.

Moreover, pre-drying may be performed before the drying step in the aerogel laminate according to the Embodiment from the viewpoint of enhancing the drying efficiency in normal pressure drying. The pre-drying method is not particularly limited. The pre-drying temperature can be 60 to 180° C., and may be 90 to 150° C. Moreover, the pre-drying time can be 1 to 30 minutes. The aerogel laminate obtained by such pre-drying can be further dried in the drying step.

In the case where the separator is laminated in the washing and solvent exchange step, from the viewpoint of drying efficiency and transportation efficiency, the separator can be removed before pre-drying, and be again laminated after pre-drying. Moreover, in the case where the washing and solvent exchange step to the drying step are continuously performed, the separator can be removed before the washing step, and be again laminated after pre-drying.

An aerogel laminate according to the Embodiment may be obtained also by conducting supercritical drying on an aerogel laminate subjected to washing, and (according to need) solvent exchange. Supercritical drying may be conducted by a publicly known technique. Examples of a method for supercritical drying include a method by which a solvent is removed at a temperature and a pressure not lower than the critical point of a solvent contained in an aerogel layer. Alternatively, examples of a method for supercritical drying include a method by which an aerogel layer is immersed in liquefied carbon dioxide for example under conditions of approx. 20 to 25° C., and 5 to 20 MPa to exchange all or part of the solvent contained in an aerogel layer for carbon dioxide having a lower critical point than that of the solvent, and then carbon dioxide alone, or a mixture of carbon dioxide and the solvent is removed.

[Second Step]

Next, the porous spacer layer 1 is disposed onto the abovementioned aerogel layer 2 of the aerogel laminate. The method of laminating the aerogel laminate and the porous spacer layer is not particularly limited; however, from the viewpoint of preventing the slippage between the aerogel laminate and the porous spacer layer, methods, such as sewing and bonding, may be used. By integrating the aerogel laminate and the porous spacer layer, the strength of the aerogel laminated composite is reinforced, and the thermal insulation properties and handling properties may be enhanced. For sewing, thin organic fiber or inorganic fiber may be used, examples of which include polyester thread, glass fiber, and meta-aramid fiber. The thickness of organic fiber or inorganic fiber used for sewing may be approx. 0.01 mm to 1.0 mm. For bonding, thermo-compression bonding adhesives, thermosetting adhesives and the like may be used. In the aerogel laminated composite of the Embodiment, the aerogel laminate and the porous spacer layer may be partially sewed or bonded.

[Thermal Insulation Material]

The thermal insulation material according to the Embodiment includes at least one of the aerogel laminated composites described above, and has high thermal insulation properties and high flexibility. The thermal insulation material may be a thermal insulation material in which a plurality of the aerogel laminated composite are laminated.

The aerogel laminated composite according to the Embodiment has at least one structure in which the porous spacer layer, the aerogel layer and the support having a heat ray reflective function or a heat ray absorbing function are laminated in the thickness direction. Because the formation of the aerogel into a thin film, which has difficulty in handling properties in the related art, is enabled, the aerogel laminated composite according to the Embodiment can be used as a thermal insulation material having high thermal insulation properties and high flexibility, and a reduction in thickness of the thermal insulation material can be attained.

Because of such advantages, the aerogel laminated composite according to the Embodiment can be used in applications as a thermal insulation material in the cryogenic field (superconductivity, cryogenic container, and the like), in the universe field, the building field, the automobile field, household electrical appliances, the semiconductor field, and industrial facilities, etc. Moreover, the aerogel laminated composite according to the Embodiment can be used, besides applications as a thermal insulation material, as a water-repellant sheet, a sound absorbing sheet, a deadening sheet, and a catalyst carrying sheet.

EXAMPLES

Next, the present invention will be described in more detail by way of Examples below, but these Examples will not be limiting the present invention in any sense. It should be noted that, hereinafter, the aerogel sheet having a structure expressed by the above Formula (2) has a ladder structure comprising a strut and a bridge, and the bridge has a structure expressed by the above Formula (2).

Example 1

[Sol Coating Solution 1]

As silicon compounds, 60.0 parts by mass of methyltrimethoxysilane (made by Shin-Etsu Chemical Co., Ltd., product name: LS-530, hereinafter, abbreviated to "MTMS") and 40.0 parts by mass of dimethyldimethoxysilane (made by Shin-Etsu Chemical Co., Ltd., product name: LS-520, hereinafter, abbreviated to "DMDMS"), 120.0 parts by mass of water, and 80.0 parts by mass of methanol were mixed, and obtained a mixture. To this mixture, 0.10 parts by mass of acetic acid as an acid catalyst was added thereto to be reacted at 25° C. for 2 hours. To this, 40.0 parts by mass of 5% aqueous ammonia as a base catalyst was added, and a sol gel reaction was performed at 60° C. for 5 hours to obtain Sol coating solution 1.

[Aerogel Laminate 1]

Sol coating solution 1 described above was applied to a double-sided aluminum deposited PET film measuring 1000 mm (length)×500 mm (width)×12 μm (thickness) (made by Hitachi AIC Inc., product name: VM-PET) as a support such that the thickness after gelation was 40 μm, and was dried at 60° C. for 6 minutes to obtain an aerogel laminate having a gel-like aerogel layer. Subsequently, the aerogel laminate obtained was placed in a tightly closed container, and was aged at 60° C. for 8 hours.

Next, the aged aerogel laminate was immersed in 5000 mL of water, and was washed over 30 minutes; then, the aged aerogel laminate was immersed in 5000 mL of methanol, and was washed at 60° C. over 30 minutes. This washing operation was performed twice while methanol was replaced with new one. Furthermore, the washed aerogel laminate was immersed in 5000 mL of methyl ethyl ketone, and solvent exchange was performed at 60° C. over 30 minutes. This solvent exchange operation was performed twice while methyl ethyl ketone was replaced with new one. The aerogel laminate subjected to washing and solvent exchange was dried under normal pressure at 120° C. for 6 hours to obtain Aerogel laminate 1 having structures represented by the above formulae (4) and (5).

[Aerogel Laminated Composite 1]

Aerogel laminated composite 1 having a porous spacer layer was obtained through laminating a polyester net having a basis weight of 16 g/m$^2$ and a mesh count of 75/cm$^2$ and measuring 1000 mm (length)×500 mm (width)×190 am (thickness) onto the aerogel layer of Aerogel laminate 1, and sewing with the polyester thread (made by ONUKI LIMITED, product name: ACE CROWN #40).

Example 2

[Sol Coating Solution 2]

200.0 parts by mass of water, 0.10 parts by mass of acetic acid as an acid catalyst, 20.0 parts by mass of CTAB as a cationic surfactant, and 120.0 parts by mass of urea as a thermally hydrolyzable compound were mixed, and obtained a mixture. To this mixture, 80.0 parts by mass of MTMS as a silicon compound, and 20.0 parts by mass of a modified polysiloxane compound having two alkoxy functional groups at both ends having a structure represented by the above Formula (B) (hereinafter, referred to as "Polysiloxane compound A") as a polysiloxane compound were added to this to be reacted at 25° C. for 2 hours. Subsequently, a sol gel reaction was performed at 60° C. for 5 hours to obtain Sol coating solution 2.

"Polysiloxane compound A" described above was synthesized as follows. First, 100.0 parts by mass of dimethylpolysiloxane having silanol groups at both ends (made by Momentive Performance Materials Inc., product name: XC96-723), 181.3 parts by mass of MTMS, and 0.50 parts by mass of t-butylamine were mixed in a 1 L 3-necked flask including a stirrer, a thermometer, and a Dimroth condenser to be reacted at 30° C. for 5 hours. Subsequently, the reaction solution was heated under a reduced pressure of 1.3 kPa at 140° C. for 2 hours to remove volatile components, yielding a modified polysiloxane compound having two alkoxy functional groups at both ends (Polysiloxane compound A).

[Aerogel Laminate 2]

Aerogel laminate 2 having structures represented by the above formulae (2), (3), (4) and (5) was obtained using Sol coating solution 2 described above in the same manner as in Example 1.

[Aerogel Laminated Composite 2]

Aerogel laminated composite 2 was obtained in the same manner as in Example 1 except that Aerogel laminate 2 and a polyester non-woven fabric having a basis weight of 15 g/m$^2$ and measuring 1000 mm (length)×500 mm (width)×100 μm (thickness) (made by UNITIKA LTD., product name: ELEVES T153WDO) were used.

Example 3

[Sol Coating Solution 3]

100.0 parts by mass of PL-2L (made by FUSO CHEMICAL CO., LTD., product name, average primary particle diameter: 20 nm, solid content: 20% by mass) as a silica particle-containing raw material, 100.0 parts by mass of water, 0.10 parts by mass of acetic acid as an acid catalyst, 20.0 parts by mass of CTAB as a cationic surfactant, and 120.0 parts by mass of urea as a thermally hydrolyzable compound were mixed, and obtained a mixture. To this mixture, 60.0 parts by mass of MTMS and 40.0 parts by mass of DMDMS as silicon compounds were added to this to be reacted at 25° C. for 2 hours. Subsequently, a sol gel reaction was performed at 60° C. for 1.0 hour to obtain Sol coating solution 3.

[Aerogel Laminate 3]

Aerogel laminate 3 having structures represented by the above formulae (4) and (5) was obtained using Sol coating solution 3 described above in the same manner as in Example 1.

[Aerogel Laminated Composite 3]

Aerogel laminated composite 3 was obtained in the same manner as in Example 1 except that Aerogel laminate 3 and a glass non-woven fabric having a basis weight of 25 g/m$^2$ and measuring 1000 mm (length)×500 mm (width)×210 μm (thickness) (ORIBEST CO., LTD., product name: FBP-025) were used.

Example 4

[Sol Coating Solution 4]

100.0 parts by mass of PL-2L as a silica particle-containing raw material, 100.0 parts by mass of water, 0.10 parts by mass of acetic acid as an acid catalyst, 20.0 parts by mass of CTAB as a cationic surfactant, and 120.0 parts by mass of urea as a thermally hydrolyzable compound were mixed, and obtained a mixture. To this mixture, 60.0 parts by mass of MTMS and 20.0 parts by mass of DMDMS as silicon compounds, and 20.0 parts by mass of X-22-160AS (made by Shin-Etsu Chemical Co., Ltd., product name) as a polysiloxane compound having a structure represented by the above Formula (A) were added to be reacted at 25° C. for 2 hours. Subsequently, a sol gel reaction was performed at 60° C. for 1.0 hour to obtain Sol coating solution 4.

[Aerogel Laminate 4]

Aerogel laminate 4 having structures represented by the above formulae (1), (1a), (2), (4) and (5) was obtained using Sol coating solution 4 described above in the same manner as in Example 1.

[Aerogel Laminated Composite 4]

Aerogel laminated composite 4 was obtained in the same manner as in Example 1 except that Aerogel laminate 4 and a nylon mesh having a basis weight of 20 g/m$^2$ and measuring 1000 mm (length)×500 mm (width)×70 μm (thickness) (made by OHKI Co., Ltd., product name: OKILON-Sha 2520) were used.

Example 5

[Sol Coating Solution 5]

100.0 parts by mass of PL-2L as a silica particle-containing raw material, 100.0 parts by mass of water, 0.10 parts by mass of acetic acid as an acid catalyst, 20.0 parts by mass of CTAB as a cationic surfactant, and 120.0 parts by mass of urea as a thermally hydrolyzable compound were mixed, and obtained a mixture. To this mixture, 60.0 parts by mass of MTMS and 20.0 parts by mass of DMDMS as silicon compounds, and 20.0 parts by mass of Polysiloxane compound A as a polysiloxane compound were added to this to be reacted at 25° C. for 2 hours. Subsequently, a sol gel reaction was performed at 60° C. for 1.0 hour to obtain Sol coating solution 5.

[Aerogel Laminate 5]

Aerogel laminate 5 having structures represented by the above formulae (2), (3), (4) and (5) was obtained using Sol coating solution 5 described above in the same manner as in Example 1.

[Aerogel Laminated Composite 5]

Aerogel laminated composite 5 was obtained in the same manner as in Example 1 except that Aerogel laminate 5 was used.

Example 6

[Aerogel Laminated Composite 6]

Aerogel laminated composite 6 was obtained in the same manner as in Example 2 except that Aerogel laminate 5 was used.

Example 7

[Aerogel Laminated Composite 7]

Aerogel laminated composite 7 was obtained in the same manner as in Example 3 except that Aerogel laminate 5 was used.

Example 8

[Sol Coating Solution 6]

100.0 parts by mass of PL-2L as a silica particle-containing raw material, 100.0 parts by mass of water, 0.10 parts by mass of acetic acid as an acid catalyst, 20.0 parts by mass of CTAB as a cationic surfactant, and 120.0 parts by mass of urea as a thermally hydrolyzable compound were mixed, and obtained a mixture. To this mixture, 60.0 parts by mass of MTMS and 20.0 parts by mass of DMDMS as silicon compounds, and 20.0 parts by mass of a modified polysiloxane compound having three alkoxy functional groups at both ends having a structure represented by the above Formula (B) (hereinafter, referred to as "Polysiloxane compound B") as a polysiloxane compound were added to be reacted at 25° C. for 2 hours. Subsequently, a sol gel reaction was performed at 60° C. for 1.0 hour to obtain Sol coating solution 6.

"Polysiloxane compound B" described above was synthesized as follows. First, 100.0 parts by mass of XC96-723, 202.6 parts by mass of tetramethoxysilane, and 0.50 parts by mass of t-butylamine were mixed in a 1-liter 3-necked flask including a stirrer, a thermometer, and a Dimroth condenser to be reacted at 30° C. for 5 hours. Subsequently, this reaction solution was heated under a reduced pressure of 1.3 kPa at 140° C. for 2 hours to remove volatile components, yielding a modified polysiloxane compound having three alkoxy functional groups at both ends (Polysiloxane compound B).

[Aerogel Laminate 6]

Aerogel laminate 6 having structures represented by the above formulae (2), (3), (4) and (5) was obtained using Sol coating solution 6 described above in the same manner as in Example 1.

[Aerogel Laminated Composite 8]

Aerogel laminated composite 8 was obtained in the same manner as in Example 4 except that Aerogel laminate 6 was used.

Example 9

[Aerogel Laminated Composite 9]

Aerogel laminated composite 9 was obtained in the same manner as in Example 1 except that Aerogel laminate 6 and a glass fiber paper having a basis weight of 12 g/m² and measuring 1000 mm (length)×500 mm (width)×66 μm (thickness) were used.

Example 10

[Aerogel Laminate 7]

Aerogel laminate 7 having structures represented by the above formulae (2), (3), (4) and (5) was obtained in the same manner as in Example 5 except that the support was changed to an aluminum foil measuring 12 μm (made by Toyo Aluminium K.K.).

[Aerogel Laminated Composite 10]

Aerogel laminated composite 10 was obtained in the same manner as in Example 1 except that Aerogel laminate 7 was used.

Example 11

[Aerogel Laminated Composite 11]

Aerogel laminated composite 11 was obtained in the same manner as in Example 4 except that Aerogel laminate 7 was used.

Example 12

[Aerogel Laminated Composite 12]

Aerogel laminated composite 12 was obtained in the same manner as in Example 9 except that Aerogel laminate 7 was used.

Comparative Example 1

[Laminated Thermal Insulation Material 1]

Laminated thermal insulation material 1 was obtained by laminating the polyester net used in Example 1 as a thermal insulation layer on a double-sided aluminum deposited PET film (made by Hitachi AIC Inc., product name: VM-PET) as a support.

Comparative Example 2

[Laminated Thermal Insulation Material 2]

Laminated thermal insulation material 2 was obtained in the same manner as in Comparative Example 1 except that the thermal insulation layer was changed to a polyester non-woven fabric (made by UNITIKA LTD., product name: ELEVES T153WDO).

Comparative Example 3

[Laminated Thermal Insulation Material 3]

Laminated thermal insulation material 3 was obtained in the same manner as in Comparative Example 1 except that the thermal insulation layer was changed to a nylon mesh (made by OHKI Co., Ltd., product name: OKILON-Sha 2520).

Comparative Example 4

[Laminated Thermal Insulation Material 4]

Laminated thermal insulation material 4 was obtained in the same manner as in Comparative Example 1 except that the thermal insulation layer was changed to the glass fiber paper used in Example 9.

Comparative Example 5

[Laminated Thermal Insulation Material 5]

Laminated thermal insulation material 5 was obtained by laminating the glass fiber paper used in Example 9 as a thermal insulation layer on an aluminum foil (made by Toyo Aluminium K.K.) as a support.

The layer configurations of the aerogel laminated composite obtained in each Example and the laminated thermal insulation material obtained in each Comparative Example are shown in Table 1.

TABLE 1

| | Porous separator layer | Thermal insulation layer | Support |
|---|---|---|---|
| Example 1 | Polyester net | Aerogel | Double-sided aluminum deposited PET film |
| Example 2 | Polyester non-woven fabric | Aerogel | Double-sided aluminum deposited PET film |
| Example 3 | Glass non-woven fabric | Aerogel | Double-sided aluminum deposited PET film |
| Example 4 | Nylon mesh | Aerogel | Double-sided aluminum deposited PET film |

TABLE 1-continued

|  | Porous separator layer | Thermal insulation layer | Support |
|---|---|---|---|
| Example 5 | Polyester net | Aerogel | Double-sided aluminum deposited PET film |
| Example 6 | Polyester non-woven fabric | Aerogel | Double-sided aluminum deposited PET film |
| Example 7 | Glass non-woven fabric | Aerogel | Double-sided aluminum deposited PET film |
| Example 8 | Nylon mesh | Aerogel | Double-sided aluminum deposited PET film |
| Example 9 | Glass fiber paper | Aerogel | Double-sided aluminum deposited PET film |
| Example 10 | Polyester net | Aerogel | Aluminum foil |
| Example 11 | Nylon mesh | Aerogel | Aluminum foil |
| Example 12 | Glass fiber paper | Aerogel | Aluminum foil |
| Comparative Example 1 | — | Polyester net | Double-sided aluminum deposited PET film |
| Comparative Example 2 | — | Polyester non-woven fabric | Double-sided aluminum deposited PET film |
| Comparative Example 3 | — | Nylon mesh | Double-sided aluminum deposited PET film |
| Comparative Example 4 | — | Glass fiber paper | Double-sided aluminum deposited PET film |
| Comparative Example 5 | — | Glass fiber paper | Aluminum foil |

EVALUATION

The aerogel laminated composites obtained in Examples and the laminated thermal insulation materials obtained in Comparative Examples were measured and evaluated according to the following conditions.

(1) Preparation of Liquid Nitrogen Container for Evaluating Thermal Insulation Properties The aerogel laminated composites and the laminated thermal insulation materials were processed into Sheet A having a size of 606 mm (length)×343 mm (width), Sheet B having a size of 612 mm (length)×362 mm (width), Sheet C having a size of 618 mm (length)×380 mm (width), Sheet D having a diameter of 105 mm, Sheet E having a diameter of 112 mm, and Sheet F having a diameter of 118 mm, respectively.

Next, as sheets for an outer periphery of a liquid nitrogen container, Sheet A10 in which 10 layers of Sheet A were laminated, Sheet B10 in which 10 layers of Sheet B were laminated, and Sheet C10 in which 10 layers of Sheet C were laminated were produced, respectively, such that supports adjacent through a porous spacer layer or a thermal insulation layer were not in direct contact with each other. In the same manner as above, as upper and lower sheets for a liquid nitrogen container, Sheet D10 in which 10 layers of Sheet D were laminated, Sheet E10 in which 10 layers of Sheet E were laminated, and Sheet F10 in which 10 layers of Sheet F were laminated were produced, respectively.

A liquid nitrogen container having a height of 600 mm and a diameter of 100 mm was prepared; Sheet A10 was disposed on the side surface, and Sheet D10 was disposed on each of the upper and lower sides of the liquid nitrogen container; the sheets were wrapped around the liquid nitrogen container to obtain a liquid nitrogen container for evaluating thermal insulation properties in which 10 layers of the aerogel laminated composite or the laminated thermal insulation material were laminated. Next, Sheet B10 was disposed on Sheet A10 and Sheet E10 was disposed on Sheet D10 to obtain a liquid nitrogen container for evaluating thermal insulation properties in which 20 layers of the aerogel laminated composite or the laminated thermal insulation material were laminated. Sheet C10 was disposed on Sheet B10, and Sheet F10 was disposed on Sheet E10 to obtain a liquid nitrogen container for evaluating thermal insulation properties in which 30 layers of the aerogel laminated composite or the laminated thermal insulation material were laminated. The connection portions between the sheets on the side surfaces and the upper and lower sheets were bonded with an aluminum tape.

Figure 4:
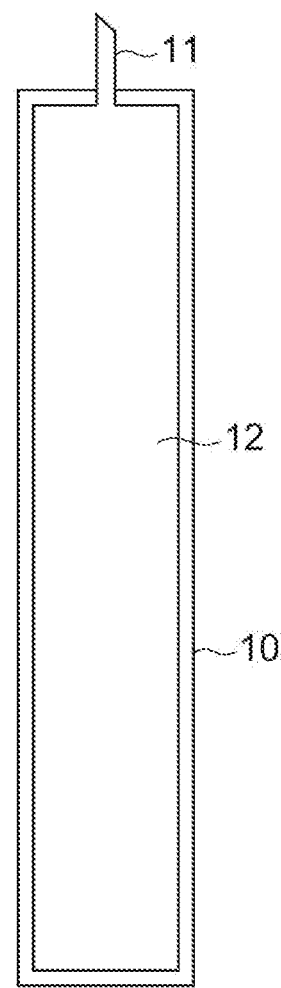
FIG. 4 is a schematic cross-sectional view of a liquid nitrogen container for evaluating thermal insulation properties.

FIG. 4 is a cross-sectional view schematically illustrating the structure of the liquid nitrogen container for evaluating thermal insulation properties in which a thermal insulation material 10 is wrapped around a liquid nitrogen container 12. The thermal insulation material 10 composed of the aerogel laminated composite or the laminated thermal insulation material is laminated on the liquid nitrogen container 12 having an inlet 11 so as to cover the outer periphery.

(2) Measurement of Thickness of Thermal Insulation Material

The total thickness D (mm) of the thermal insulation material 10 disposed on the outer periphery of the liquid nitrogen container 12 was calculated from the following expression:

$$D=D_c/2-50.0$$

where $D_c$ (mm) represents the diameter of the liquid nitrogen container after the aerogel laminated composite or the laminated thermal insulation material are wrapped around the container.

(3) Thermal Insulation Performance (Heat Flux)

The thermal insulation performance was measured using the liquid nitrogen container for evaluating thermal insulation properties.

Figure 5:
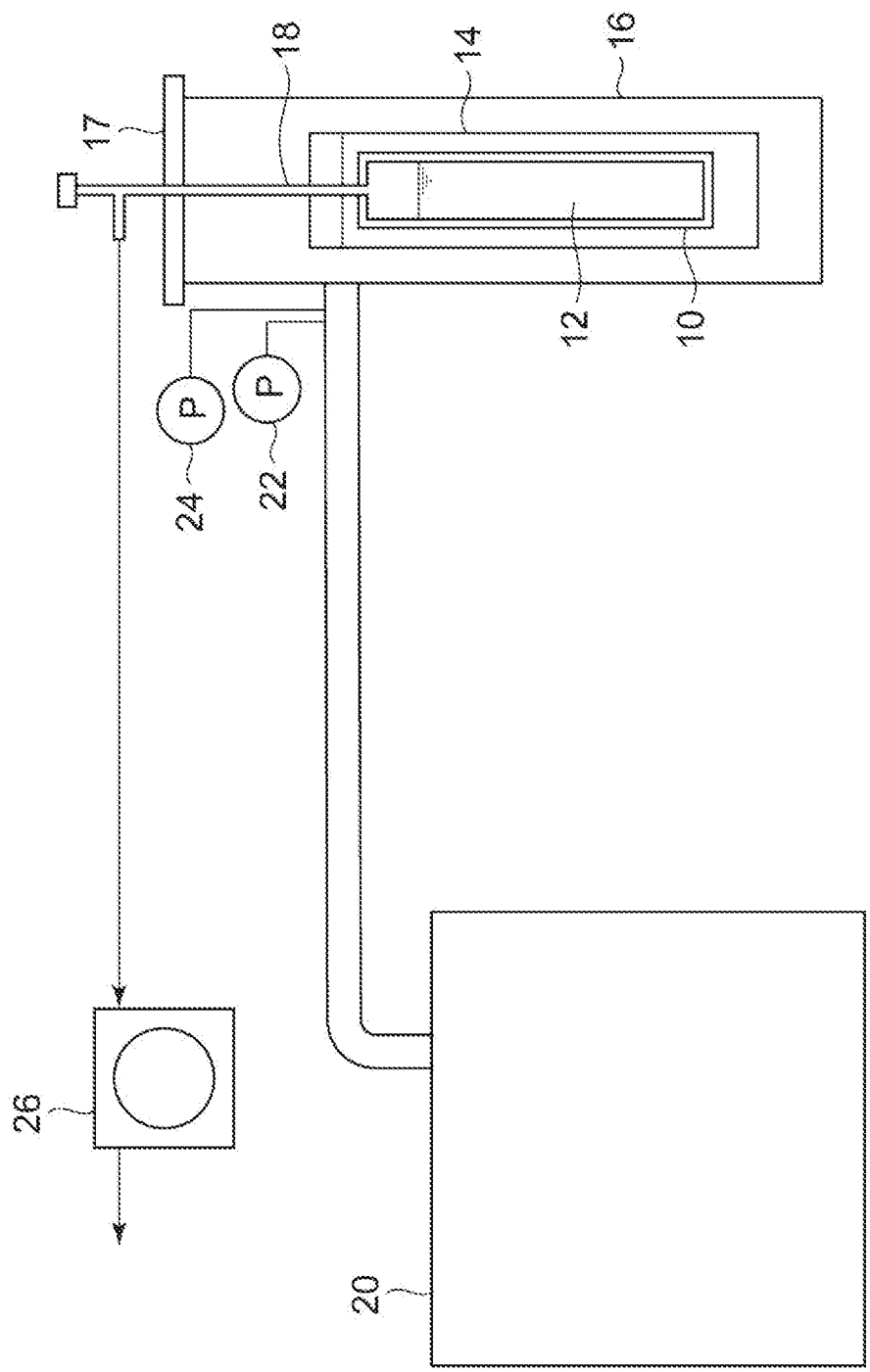
FIG. 5 is a schematic view of a thermal insulation performance tester.

A schematic view of the thermal insulation performance tester is illustrated in FIG. 5. First, the liquid nitrogen container 12 having the thermal insulation material 10 wrapped therearound was placed in a thermostat 14 set at 283 K, and the thermostat was placed in a vacuum container 16. Next, the vacuum container 16 was evacuated with a turbomolecular pump 20, and the vacuum pressure inside the vacuum container 16 was measured with a Pirani vacuum gauge 22 and an ion vacuum gauge 24. The turbomolecular pump 20 was operated, and it was checked that the Pirani vacuum gauge 22 indicated a vacuum pressure of $4\times10^{-1}$ Pa or less; then, the vacuum pressure was measured with the ion vacuum gauge 24, and evacuation was performed for 7 days until the pressure of the vacuum container 16 reached $1\times10^{-2}$ Pa or less. Subsequently, after liquid nitrogen was poured into the liquid nitrogen container 12 placed in the vacuum container 16, the heat flux q passing through the thermal insulation material 10 when it was verified that the temperature of a neck pipe 18 and the flow rate of evaporated nitrogen gas had approximately constant values and were in a stationary state was calculated.

The evaporating gas mass flow rate m (kg/s) of liquid nitrogen was determined from the following expression (I).

[Expression 1]

$$m=\rho_{g,T}\times V_{g,T} \tag{I}$$

In the expression (I), $\rho_{g,T}$ represents the gas density (kg/m$^3$) at room temperature; $V_{g,T}$ represents the gas flow rate (m$^3$/s) at room temperature measured from the output of a wet flow meter 26 and the temperature inside the wet flow meter 26.

Next, the sum of the radiant heat quantity $Q_r$ (W) coming through the thermal insulation material 10 and the conductive heat $Q_c$ (W) from the neck pipe 18 connecting a flange 17 to the liquid nitrogen container 12 was determined from the following expression (II).

[Expression 2]

$$Q_r + Q_c = \frac{m \times L}{\left(1 - \frac{\rho_{g,s}}{\rho_{l,s}}\right)} \quad \text{(II)}$$

In the expression (II), L represents the evaporative latent heat (J/kg) of liquid nitrogen, $\rho_{g,s}$ represents the nitrogen gas density (kg/m³) at a saturated temperature under atmospheric pressure, and $\rho_{l,s}$ represents the liquid nitrogen density (kg/m³).

Moreover, $Q_c$ was determined from the following expression (III).

[Expression 3]

$$Q_c = \left(\frac{A_s}{L_c} \int_{T_l}^{T_h} \lambda_{sus} dT\right) \times \phi \quad \text{(III)}$$

In the expression (III), the expression in the brackets ( ) represents the conductive heat of the neck pipe 18, $A_s$ (m²) represents the cross-sectional area of the neck pipe 18, $L_c$ (m) represents the length of the neck pipe 18, $T_h$ (K) represents a high temperature, $T_l$ (K) represents a low temperature, and $\lambda_{sus}$ (W/(m·K)) represents the thermal conductivity of stainless steel. The conductive heat of the neck pipe 18 is related with the coefficient of the efficiency φ because heat is lost from the surface of the neck pipe 18 due to heat conduction of evaporating gas.

The efficiency φ was determined from the following expression (IV).

[Expression 4]

$$\phi = \frac{\ln(1 + C_p(T_h - T_l)/L)}{C_p(T_h - T_l)/L} \quad \text{(IV)}$$

In the expression (IV), $C_p$ (J/(kg·K)) represents the specific heat. In this evaluation, the value of $A_s$ above is $0.243 \times 10^{-4}$ (m²), and the value of L above is 199000 (J/kg).

The heat flux q (W/m²) passing through the aerogel laminated composite and the laminated thermal insulation material was determined from the following expression (V). The measurement of the heat flux was performed three times, and the average value was defined as the heat flux in this evaluation.

[Expression 5]

$$q = Q_r/A_r \quad \text{(v)}$$

In the expression (V), $A_r$ (m²) represents the surface area of the liquid nitrogen container, and the value is 0.2041 (m²).

The evaluation results of thermal insulation properties of the aerogel laminated composite obtained in each Example and the laminated thermal insulation material obtained in each Comparative Example are shown in Table 2.

TABLE 2

|  | 10 layers | | 20 layers | | 30 layers | |
| --- | --- | --- | --- | --- | --- | --- |
|  | Heat flux (W/m²) | Thickness (mm) | Heat flux (W/m²) | Thickness (mm) | Heat flux (W/m²) | Thickness (mm) |
| Example 1 | 0.76 | 4.1 | 0.66 | 8.1 | 0.56 | 12.1 |
| Example 2 | 0.84 | 3.1 | 0.74 | 6.2 | 0.64 | 9.3 |
| Example 3 | 0.86 | 4.1 | 0.76 | 8.1 | 0.66 | 12.1 |
| Example 4 | 0.87 | 2.7 | 0.77 | 5.3 | 0.67 | 7.9 |
| Example 5 | 0.71 | 4.1 | 0.61 | 8.1 | 0.50 | 12.1 |
| Example 6 | 0.86 | 3.0 | 0.76 | 6.2 | 0.66 | 9.2 |
| Example 7 | 0.84 | 4.0 | 0.74 | 8.1 | 0.64 | 12.1 |
| Example 8 | 0.79 | 2.7 | 0.69 | 5.3 | 0.59 | 7.9 |
| Example 9 | 0.83 | 2.7 | 0.73 | 5.3 | 0.63 | 7.9 |
| Example 10 | 0.79 | 4.1 | 0.70 | 8.1 | 0.60 | 12.1 |
| Example 11 | 0.89 | 2.7 | 0.79 | 5.4 | 0.69 | 8.0 |
| Example 12 | 0.93 | 2.7 | 0.83 | 5.4 | 0.73 | 7.9 |
| Comparative Example 1 | 1.11 | 3.7 | 1.02 | 7.3 | 0.90 | 10.9 |
| Comparative Example 2 | 1.20 | 2.7 | 1.10 | 5.4 | 1.00 | 8.0 |
| Comparative Example 3 | 1.18 | 2.5 | 1.08 | 5.1 | 0.98 | 7.5 |
| Comparative Example 4 | 1.34 | 2.5 | 1.24 | 5.1 | 1.14 | 7.6 |
| Comparative Example 5 | 1.42 | 2.5 | 1.32 | 5.0 | 1.20 | 7.5 |

It can be verified from Table 1 that the heat flux is small and the thermal insulation performance is high in the case where the aerogel laminated composites produced in Examples are used. Moreover, it can be verified that in the aerogel laminated composites produced in Examples, less number of layers can provide a comparable heat flux and the thickness of the thermal insulation material can be reduced compared to Comparative Examples.

REFERENCE SIGNS LIST

1 . . . porous spacer layer, 2 . . . aerogel layer, 3 . . . support, 10 . . . thermal insulation material, 11 . . . inlet, 12 . . . liquid nitrogen container, 14 . . . thermostat, 16 . . . vacuum container, 17 . . . flange, 18 . . . neck pipe, 20 . . . turbomolecular pump, 22 . . . Pirani vacuum gauge, 24 . . . ion vacuum gauge, 26 . . . wet flow meter, L . . . circumscribed rectangle, P . . . silica particle.

The invention claimed is:

1. An aerogel laminated composite having a structure in which a porous spacer layer, an aerogel layer having a thickness ranging from 1 to 200 μm, and a support having a heat ray reflective function or a heat ray absorbing function are laminated in this order, the porous spacer layer comprising at least one selected from a glass non-woven fabric, a polyester non-woven fabric, and a glass fiber paper, and the aerogel layer comprising an aerogel including a ladder structure containing a structure represented by the following formula (3):

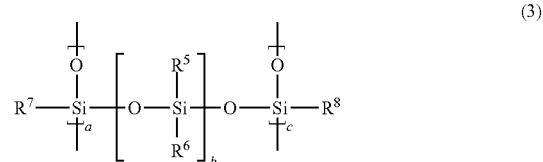

(3)

where in formula (3), $R^5$, $R^6$, $R^7$ and $R^8$ each independently represent an alkyl group or an aryl group, a and c each independently represent an integer of 1 to 3000, and b represents an integer of 1 to 50.

2. The aerogel laminated composite according to claim 1, wherein the porous spacer layer further comprises at least one selected from nylon fiber, polyester fiber, polyimide fiber and glass fiber.

3. The aerogel laminated composite according to claim 1, wherein the porous spacer layer comprises at least one selected from a glass non-woven fabric and a glass fiber paper.

4. The aerogel laminated composite according to claim 1, wherein the aerogel layer is a layer containing an aerogel having a structure derived from polysiloxane.

5. The aerogel laminated composite according to claim 1, wherein the aerogel layer is a layer composed of a dry product of a wet gel that is a condensation product of a sol containing at least one selected from a silicon compound having a hydrolyzable functional group or a condensable functional group, and a hydrolysis product of the silicon compound having a hydrolyzable functional group.

6. The aerogel laminated composite according to claim 5, wherein the sol further contains silica particles.

7. The aerogel laminated composite according to claim 6, wherein an average primary particle diameter of the silica particles is 1 nm or more and 500 nm or less.

8. The aerogel laminated composite according to claim 1, wherein the support has a layer composed of a material comprising at least one selected from carbon graphite, aluminum, magnesium, silver, titanium, carbon black, metal sulfates, and antimony compounds.

9. The aerogel laminated composite according to claim 1, wherein the support is an aluminum foil, an aluminum deposited film, a silver deposited film, or an antimony oxide containing film.

10. The aerogel laminated composite according to claim 1, wherein the support is an aluminum foil or an aluminum deposited film.

11. A thermal insulation material including the aerogel laminated composite according to claim 1.

12. The aerogel laminated composite according to claim 1, wherein b represents an integer of 5 to 50.

13. An aerogel laminated composite comprising a laminate including a spacer layer, an aerogel layer, and a support, the aerogel layer being between the spacer layer and the support, and the aerogel layer comprising an aerogel including a ladder structure containing a structure represented by the following formula (3):

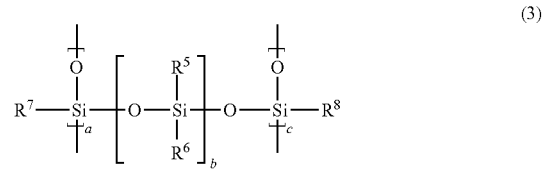

where in formula (3), $R^5$, $R^6$, $R^7$ and $R^8$ each independently represent an alkyl group or an aryl group, a and c each independently represent an integer of 1 to 3000, and b represents an integer of 1 to 50.

14. The aerogel laminated composite according to claim 13, wherein the porous spacer layer comprises at least one selected from nylon fiber, polyester fiber, polyimide fiber and glass fiber.

15. The aerogel laminated composite according to claim 13, wherein the porous spacer layer comprises at least one selected from a glass non-woven fabric, a polyester non-woven fabric, a glass fiber paper, a polyester net, and a nylon mesh.

16. The aerogel laminated composite according to claim 13, wherein the support comprises at least one selected from carbon graphite, aluminum, magnesium, silver, titanium, carbon black, metal sulfates, and antimony compounds.

17. The aerogel laminated composite according to claim 13, wherein the support comprises at least one of an aluminum foil, an aluminum deposited film, a silver deposited film, and an antimony oxide containing film.

18. The aerogel laminated composite according to claim 13, wherein b represents an integer of 5 to 50.

* * * * *